United States Patent
Oh et al.

(10) Patent No.: US 10,734,901 B2
(45) Date of Patent: Aug. 4, 2020

(54) ELECTRONIC DEVICE INCLUDING CIRCUIT CONFIGURED TO OPERATE USING BOOSTED VOLTAGE

(71) Applicant: SAMSUNG ELECTRONICS CO., LTD., Suwon-si, Gyeonggi-Do (KR)

(72) Inventors: Hyoungseok Oh, Seoul (KR); Youngjin Moon, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 203 days.

(21) Appl. No.: 16/028,460

(22) Filed: Jul. 6, 2018

(65) Prior Publication Data

US 2019/0173382 A1    Jun. 6, 2019

(30) Foreign Application Priority Data

Dec. 5, 2017 (KR) .......................... 10-2017-0166223

(51) Int. Cl.
*H02M 3/158* (2006.01)
*H02M 3/335* (2006.01)
*H04W 4/80* (2018.01)
*H04W 52/00* (2009.01)

(52) U.S. Cl.
CPC ....... *H02M 3/1582* (2013.01); *H02M 3/1588* (2013.01); *H02M 3/33576* (2013.01); *H04W 4/80* (2018.02); *H04W 52/00* (2013.01); *H02M 3/158* (2013.01)

(58) Field of Classification Search
CPC .. H02J 50/00; H02J 50/10; H02J 50/12; H02J 17/00; H04B 5/00; H04B 5/0075; H04B 5/0093; H04B 5/0037; H01F 38/14; H02M 3/1582; H02M 3/33576; H02M 3/1588; H02M 3/158; H04W 52/00; H04W 4/80
USPC ........................................................ 320/108
See application file for complete search history.

(56) References Cited

U.S. PATENT DOCUMENTS

| | | | | |
|---|---|---|---|---|
| 5,563,464 A | * | 10/1996 | Okubu | H02N 2/14 310/316.02 |
| 6,208,497 B1 | * | 3/2001 | Seale | H02P 25/032 361/160 |
| 7,161,359 B2 | * | 1/2007 | Denen | A47K 10/3687 324/662 |
| 7,920,396 B2 | | 4/2011 | Knight | |
| 8,436,592 B2 | * | 5/2013 | Saitoh | H02M 3/1582 323/225 |

(Continued)

FOREIGN PATENT DOCUMENTS

KR    1020160055680 A    5/2016

*Primary Examiner* — M Baye Diao
(74) *Attorney, Agent, or Firm* — Volentine, Whitt & Francos, PLLC

(57) ABSTRACT

An electronic device includes a transmitter circuit, an inductive element, and a boost converter. The transmitter circuit outputs a current, which has a varying level, based on a supply voltage. The inductive element generates an output signal based on the current, such that wireless communication with an external device is performed. The boost converter boosts a system voltage to output the supply voltage. A voltage level of the supply voltage provided from the boost converter to the transmitter circuit based on the boosted system voltage is maintained to be equal to or higher than a reference level which is higher than a voltage level of the system voltage, regardless of a decrease in the voltage level of the system voltage.

20 Claims, 16 Drawing Sheets

(56) References Cited

U.S. PATENT DOCUMENTS

| | | | |
|---|---|---|---|
| 8,520,414 B2 | 8/2013 | Garrity et al. | |
| 9,002,916 B1 * | 4/2015 | Ensinger | G06F 1/10 |
| | | | 708/271 |
| 9,083,178 B2 * | 7/2015 | Kim | H02J 5/005 |
| 9,088,216 B2 | 7/2015 | Garrity et al. | |
| 9,373,069 B2 | 6/2016 | Cloutier et al. | |
| 9,477,514 B2 | 10/2016 | Greiner et al. | |
| 9,728,989 B2 * | 8/2017 | Kim | H02J 7/02 |
| 9,733,693 B2 * | 8/2017 | Julicher | H02J 4/00 |
| 9,893,552 B2 * | 2/2018 | Jeon | H02J 50/80 |
| 9,973,008 B1 * | 5/2018 | Leabman | H02J 7/025 |
| 10,374,447 B2 * | 8/2019 | Deboy | H02J 7/0077 |
| 2008/0297124 A1 * | 12/2008 | Koljonen | H03G 3/007 |
| | | | 323/234 |
| 2012/0312879 A1 | 12/2012 | Rolin et al. | |
| 2016/0268834 A1 | 9/2016 | Satyamoorthy et al. | |
| 2016/0352146 A1 * | 12/2016 | Khandelwal | H02J 5/005 |
| 2016/0380455 A1 | 12/2016 | Greening et al. | |
| 2017/0085080 A1 | 3/2017 | Huang et al. | |
| 2018/0309315 A1 * | 10/2018 | Der | H02J 50/80 |

\* cited by examiner

FIG. 16

| Mode | Direction of Power transfer | Charger |
|---|---|---|
| Charging | WCIN(CHGIN) → VBAT | Buck Converter |
| MST | VBAT → WCIN(CHGIN) | Boost Converter |
| Power Source | VBAT → WCIN(CHGIN) | Boost Converter |

ELECTRONIC DEVICE INCLUDING CIRCUIT CONFIGURED TO OPERATE USING BOOSTED VOLTAGE

CROSS-REFERENCE TO RELATED APPLICATIONS

This application claims priority under 35 U.S.C. § 119 to Korean Patent Application No. 10-2017-0166223 filed on Dec. 5, 2017, in the Korean Intellectual Property Office, the disclosure of which is incorporated herein by reference in its entirety.

TECHNICAL FIELD

The present disclosure relates to an electronic circuit and an electronic device, and more particularly, relates to a configuration and an operation associated with supplying power to the electronic circuit or the electronic device.

DISCUSSION OF RELATED ART

In recent years, various kinds of electronic devices are being used. An electronic device performs its own functions according to operations of electronic circuits included in the electronic device. The electronic device may operate independently to perform its own functions. In addition, the electronic device may operate while communicating with another external device. To this end, the electronic device may include a communication circuit (e.g., a transmitter circuit and a receiver circuit).

Communication between two electronic devices is performed in a wired manner and/or in a wireless manner. In particular, since wireless communication improves user convenience, various technologies associated with the wireless communication are being developed and advanced. The wireless communication between two electronic devices is performed at a near distance or a far distance.

Magnetic secure transmission (MST) is one of various methods for performing near field wireless communication. The MST is employed to exchange card information and financial information between a user device and a reader device without a magnetic credit card or an integrated circuit (IC) credit card. The MST is widely employed in various user devices due to user convenience. In addition, the MST does not require a dedicated reader and does not require changing a configuration of an existing reader device. Accordingly, the MST-based communication is considered to be very useful and beneficial.

The MST-based communication is performed with consuming power in an electronic device. Meanwhile, power consumption for the MST-based communication may affect various factors such as communication distance, communication reliability, operation stability, and/or the like. In addition, implementing the MST with a small amount of power in a portable electronic device which operates using a battery is helpful to make user satisfaction high. Accordingly, managing power suitably for the MST-based communication may be an important issue.

SUMMARY

Example embodiments of the present disclosure may provide configurations and operations of an electronic device which includes a transmitter circuit (e.g., an MST circuit). In some example embodiments, the transmitter circuit may operate using a boosted voltage.

In some example embodiments, an electronic device may include a transmitter circuit, an inductive element, and a boost converter. The transmitter circuit may output a current having a level which varies corresponding to values of data, based on a supply voltage. The inductive element may generate an output signal based on the current, such that wireless communication with an external device is performed with regard to the data. The boost converter may boost a system voltage to output the supply voltage. A voltage level of the supply voltage provided from the boost converter to the transmitter circuit based on the boosted system voltage may be maintained to be equal to or higher than a reference level which is higher than a voltage level of the system voltage, regardless of a decrease in the voltage level of the system voltage.

In some example embodiments, an electronic device may include an inductive element, a transmitter circuit, and a charger circuit. The inductive element may generate an output signal based on a current. The transmitter circuit may output the current to the inductive element based on a supply voltage. The charger circuit may boost a voltage of a battery terminal to output the supply voltage, such that a voltage level of the supply voltage is maintained to be equal to or higher than a reference level which is higher than a voltage level of the voltage of the battery terminal, regardless of the voltage level of the voltage of the battery terminal. The supply voltage output from the charger circuit may be provided to the transmitter circuit through a charging input terminal based on the boosted voltage.

In some example embodiments, an electronic device may include a transmitter circuit and an inductive element. The transmitter circuit may output a current based on a supply voltage. The inductive element may generate an output signal based on the current. A voltage level of the supply voltage received in the transmitter circuit may be maintained between a first reference level and a second reference level. Each of the first reference level and the second reference level may be higher than a voltage level of a battery voltage. A current level of the current output from the transmitter circuit to the inductive element may vary between a positive peak level and a negative peak level. Amplitudes of the positive peak level and the negative peak level may vary between a first reference amplitude and a second reference amplitude.

In some example embodiments, an electronic device may include an inductive element and a voltage converter. The inductive element generates a magnetic flux based on a current drawn by the inductive element. The voltage converter converts an input voltage to a driving voltage for the inductive element, such that the driving voltage is maintained within a range of voltages exceeding the input voltage for all amplitudes of the current drawn by the inductive element.

According to some example embodiments, a suitable communication distance may be provided between electronic devices, and stability of an operation of an electronic device may be improved.

BRIEF DESCRIPTION OF THE DRAWINGS

The above and other objects and features of the present disclosure will become apparent by describing in detail example embodiments thereof with reference to the accompanying drawings.

FIG. 16 is a table for describing operations of a charger circuit with regard to an example configuration of FIG. 11 or 15.

DETAILED DESCRIPTION OF EXAMPLE EMBODIMENTS

Below, some example embodiments will be described in detail and clearly with reference to accompanying drawings such that those skilled in the art can easily implement the example embodiments.

Figure 1:
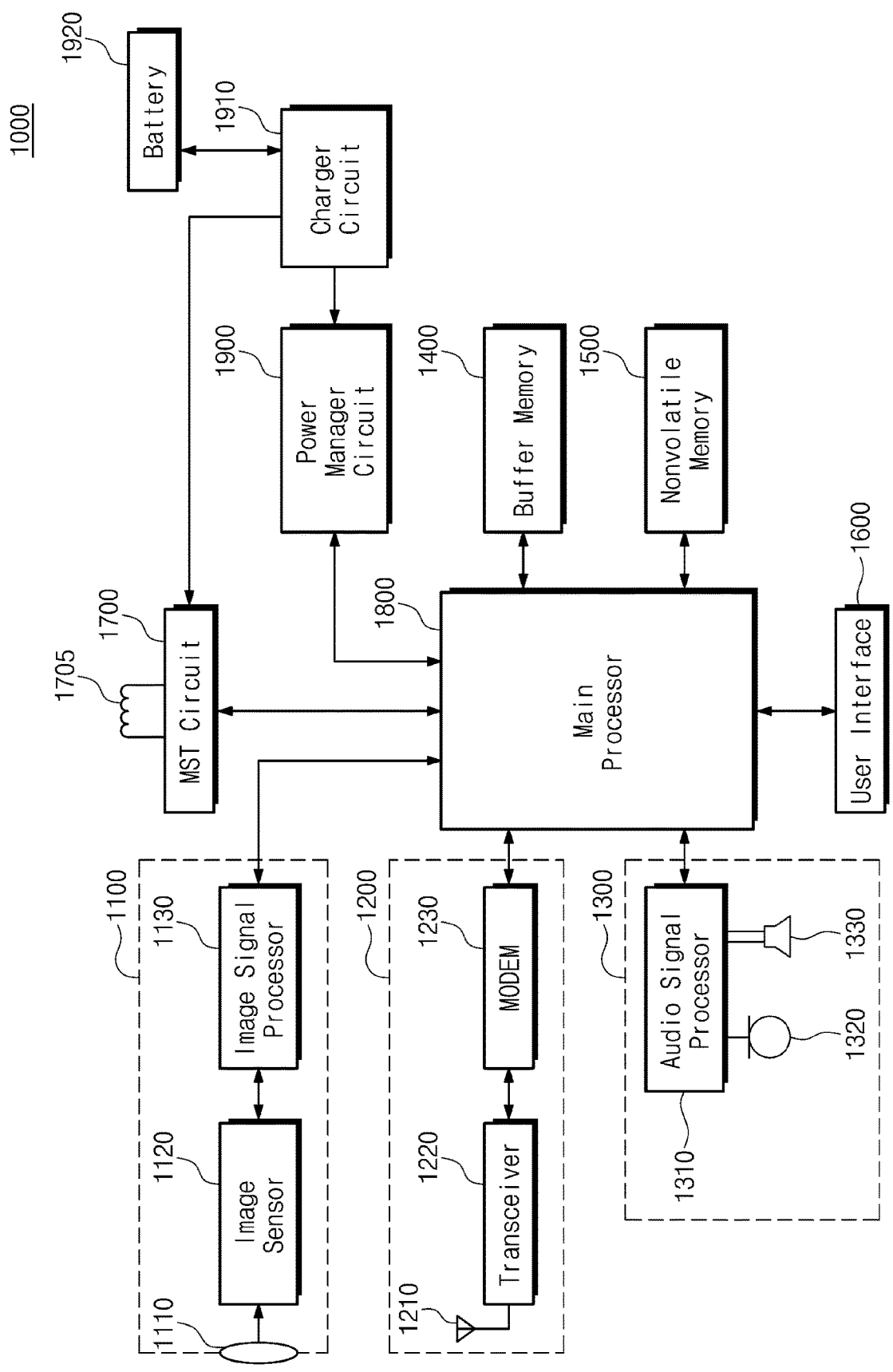
FIG. 1 is a block diagram illustrating an example configuration of an electronic device which includes an electronic circuit according to some example embodiments.

FIG. 1 is a block diagram illustrating an example configuration of an electronic device 1000 which includes an electronic circuit according to some example embodiments. For example, the electronic device 1000 may be implemented with one of various types of electronic devices such as a smart phone, a tablet computer, a laptop computer, a wearable device, and/or the like.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a magnetic secure transmission (MST) circuit 1700, an inductive element 1705, a main processor 1800, a power manager circuit 1900, and a charger circuit 1910. For example, the electronic device 1000 may be connected to a battery 1920, and the battery 1920 may supply power used in an operation of the electronic device 1000.

The image processing block 1100 may receive light through a lens 1110. An image sensor 1120 and an image signal processor 1130 included in the image processing block 1100 may generate image information associated with an external object, based on the received light.

The communication block 1200 may exchange signals with an external device/system through an antenna 1210. A transceiver 1220 and a modulator/demodulator (MODEM) 1230 of the communication block 1200 may process signals exchanged with the external device/system in compliance with a wireless communication protocol such as long term evolution (LTE), worldwide interoperability for microwave access (WIMAX), global system for mobile communication (GSM), code division multiple access (CDMA), wireless fidelity (Wi-Fi), Bluetooth, and/or the like.

The audio processing block 1300 may process sound information by using an audio signal processor 1310, and thus may play and output audio. The audio processing block 1300 may receive an audio input through a microphone 1320. The audio processing block 1300 may output the audio through a speaker 1330.

The buffer memory 1400 may store data used for an operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may store data regardless of power being supplied. For example, the nonvolatile memory 1500 may include at least one of various nonvolatile memories such as a flash memory, a PRAM, an MRAM, a ReRAM, and/or an FRAM. For example, the nonvolatile memory 1500 may include a removable memory such as a secure digital (SD) card, and/or an embedded memory such as an embedded multimedia card (eMMC).

The user interface 1600 may arbitrate in communication between a user and the electronic device 1000. For example, the user interface 1600 may include input interfaces such as a keypad, a button, a touch screen, a touch pad, a gyroscope sensor, a vibration sensor, an acceleration sensor, and/or the like. For example, the user interface 1600 may include output interfaces such as a motor, an organic light emitting diode (OLED) display, an active matrix OLED (AMOLED) display, an LED lamp, and/or the like.

The MST circuit 1700 may wirelessly communicate with an external device/system (e.g., a reader device). The MST circuit 1700 may communicate with an external device/system through the inductive element 1705. Example communication through the inductive element 1705 will be described with reference to FIGS. 3 and 4. In addition, example configurations and example operations of the MST circuit 1700 will be described with reference to FIGS. 5 to 16.

The main processor 1800 may control overall operations of components of the electronic device 1000. The main processor 1800 may process various operations to operate the electronic device 1000. For example, the main processor 1800 may be implemented with an operation processing device/circuit, which includes one or more processor cores, such as a general-purpose processor, a special-purpose processor, an application processor, a microprocessor, and/or the like.

The power manager circuit 1900 may supply power to components of the electronic device 1000. For example, the charger circuit 1910 may output a system voltage based on power received from the battery 1920 and/or an external power source. The power manager circuit 1900 may output power to be supplied to components of the electronic device 1000, based on the system voltage. The power manager circuit 1900 may supply power, which is obtained by suitably converting the system voltage, to components of the electronic device 1000.

For example, the charger circuit 1910 may output a charging voltage based on power received from an external power source in a wired manner or in a wireless manner. The charging voltage may be used to charge the battery 1920. For example, the charger circuit 1910 may output an operation voltage based on power supplied from the battery 1920. The operation voltage may be used to operate a peripheral device (e.g., a keyboard, an external storage device, and/or the like) connected to the electronic device 1000. The charger circuit 1910 may operate as an interface power manager to suitably transfer and distribute power which is used in the electronic device 1000.

However, the example components illustrated in FIG. 1 are provided to facilitate better understanding, and are not intended to limit the present disclosure. The electronic device 1000 may not include one or more of the components illustrated in FIG. 1 or may further include at least one component not illustrated in FIG. 1.

Figure 2:
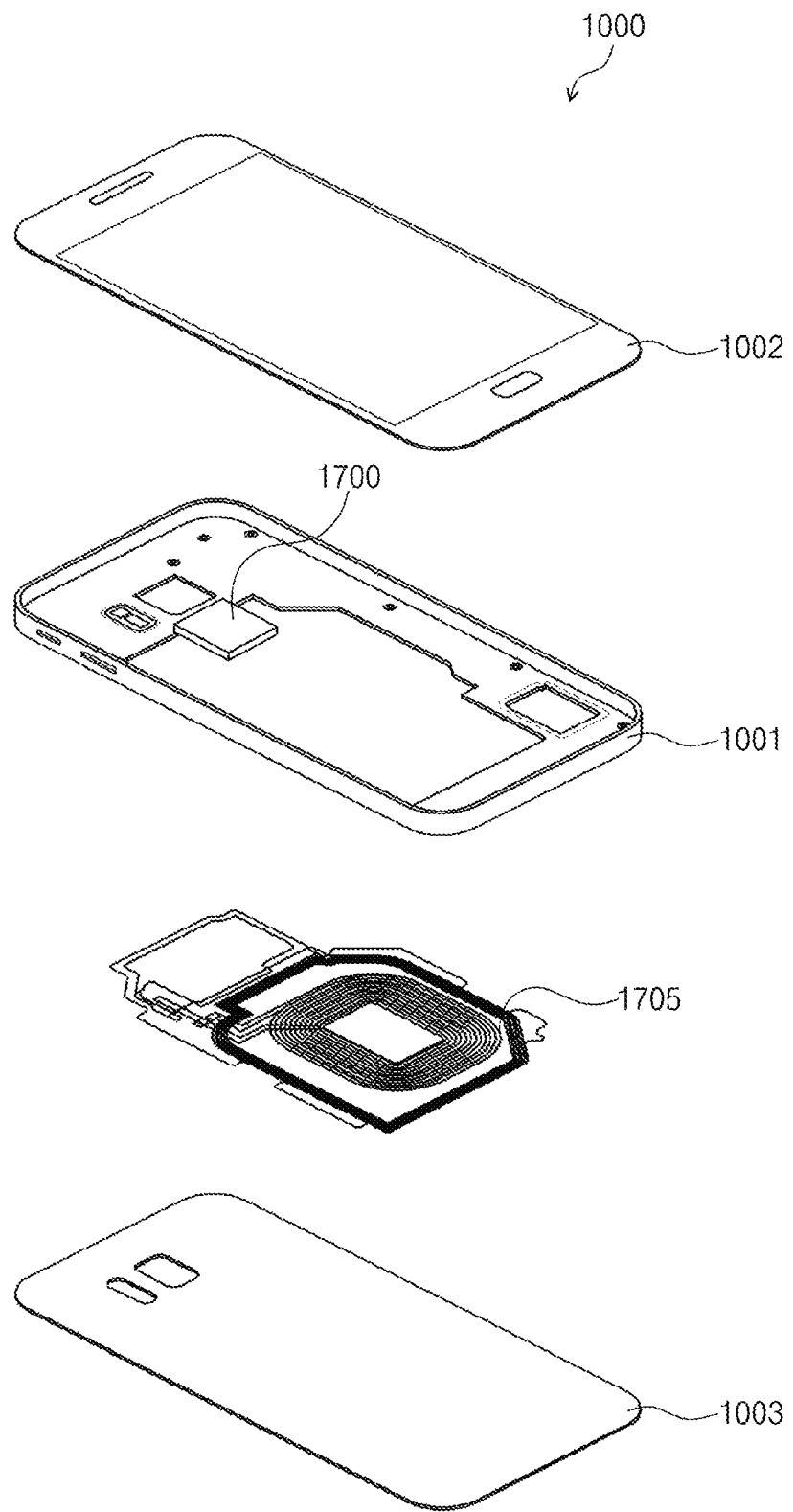
FIG. 2 is a conceptual diagram illustrating an example configuration of an electronic device of FIG. 1.

FIG. 2 is a conceptual diagram illustrating an example configuration of the electronic device 1000 of FIG. 1. For example, FIG. 2 illustrates that the electronic device 1000 is a smart phone. However, the present disclosure is not limited to the example of FIG. 2. It may be readily understood that a configuration similar to the configuration illustrated in FIG. 2 may be employed in another type of electronic device.

The electronic device 1000 may include a housing 1001 to dispose various electronic circuits in the electronic device 1000. For example, components (e.g., the MST circuit 1700) of the electronic device 1000 may be disposed within the housing 1001, and thus may be equipped in the electronic device 1000. The MST circuit 1700 may be implemented with an electronic circuit chip or chip package. The electronic device 1000 may include an upper (or top) cover 1002 and a lower (or bottom) cover 1003 to separate an inner space of the housing 1001 from the outside of the electronic device 1000.

The inductive element 1705 may include a conductive material. In some example embodiments, the inductive element 1705 may be implemented in the form of a coil to generate magnetic flux based on a current. The inductive element 1705 may be connected to the MST circuit 1700. The inductive element 1705 may generate the magnetic flux in response to a current provided from the MST circuit 1700. The electronic device 1000 may wirelessly communicate with an external device/system by using the magnetic flux generated by the inductive element 1705.

The inductive element 1705 may be interposed between the upper cover 1002 and the lower cover 1003. For example, the inductive element 1705 may be disposed adjacent to the outside of the electronic device 1000 (e.g., to be in contact with one surface of the lower cover 1003) to provide stable and accurate communication.

However, the example of FIG. 2 is provided to facilitate better understanding, and is not intended to limit the present disclosure. A shape, disposition, a location, and connection of each component may be variously changed or modified depending on factors such as a type, a configuration, a function, and/or the like, of the electronic device 1000.

Figure 3:
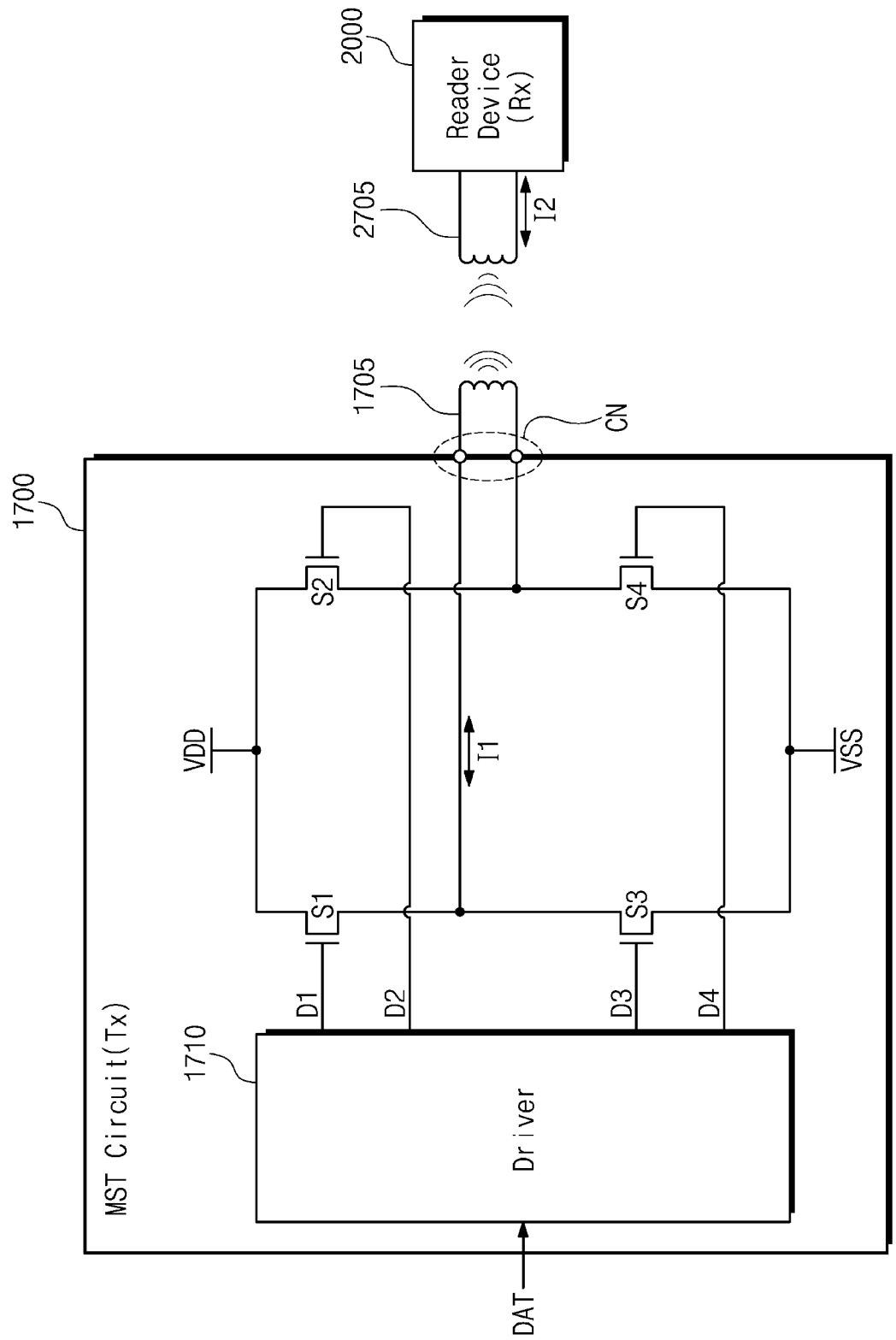
FIG. 3 is a block diagram illustrating an example configuration associated with a magnetic secure transmission (MST) circuit of FIG. 1.

FIG. 3 is a block diagram illustrating an example configuration associated with the MST circuit 1700 of FIG. 1.

The MST circuit 1700 may be connected to the inductive element 1705 through connection nodes CN. The MST circuit 1700 may output a current I1, and the inductive element 1705 may generate magnetic flux based on the current I1 from the MST circuit 1700.

The MST circuit 1700 may generate the current I1 based on data DAT. In some example embodiments, the data DAT may include information of a credit card which is in the possession of a user of the electronic device 1000. For example, the data DAT may include information associated with a type of the credit card, an identification number of the credit card, an expiration date of the credit card, and/or the like. However, this is to describe one of possible example embodiments, and is not intended to limit the present disclosure. The data DAT may include another kind of information.

For example, the data DAT may be stored in the buffer memory 1400 and/or the nonvolatile memory 1500. The data DAT may be directly read from the buffer memory 1400 and/or the nonvolatile memory 1500, or may be read through the main processor 1800. For another example, the data DAT may be stored in an internal memory of the main processor 1800. For example, when the data DAT includes information of a credit card, the data DAT may be stored in a secure area included in the buffer memory 1400, the nonvolatile memory 1500, and/or the internal memory of the main processor 1800.

The MST circuit 1700 may output the current I1 to the inductive element 1705. The current I1 may have a level which varies corresponding to values of the data DAT. Magnetic flux may be induced in the inductive element 1705 in response to the variation in the level of the current I1. The inductive element 1705 may output an output signal (e.g., the induced magnetic flux) based on the current I1, and thus wireless communication with a reader device 2000 may be performed with regard to the data DAT.

The reader device 2000 may be an external device which is separate from the electronic device 1000. For example, the reader device 2000 may be an electronic device (e.g., a point-of-sale (POS) device or a point-of-purchase (POP) device) which is capable of collecting information of a credit card and providing financial services (e.g., payment management, credit information processing, and/or the like) based on the collected information.

An inductive element 2705 may be provided in the reader device 2000. Similar to the inductive element 1705, the inductive element 2705 may include a conductive material and may be configured in the form of a coil. A current I2 may be generated through the inductive element 2705 based on the magnetic flux generated by the inductive element 1705.

The reader device 2000 may obtain information associated with the data DAT, based on the current I2. For example, when the data DAT includes information of a credit card, the reader device 2000 may obtain the information of the credit card, based on the current I2. In this example, the MST circuit 1700 may be employed to exchange card information and financial information between the electronic device 1000 and the reader device 2000. The user of the electronic device 1000 may provide the card information and the financial information to the reader device 2000 without a magnetic credit card or an integrated circuit (IC) credit card.

The above descriptions are associated with communication for exchanging the card information and the financial information, but the present disclosure is not limited to the above descriptions. Communication between the MST circuit 1700 and the reader device 2000 may be employed to exchange another kind of information.

In addition, the above descriptions are associated with MST-based communication using the MST circuit 1700 and the inductive element 1705, but the present disclosure is not limited to the above descriptions. It may be readily understood that example embodiments of the present disclosure may be employed in various other kinds of communication for exchanging information based on the current I1.

The MST circuit 1700 may operate to transmit information to the reader device 2000, and the reader device 2000 may operate to receive information from the electronic device 1000 which includes the MST circuit 1700. In this regard, the MST circuit 1700 may be understood as a transmitter circuit, and the reader device 2000 may be understood as a receiver device.

In some example embodiments, the MST circuit 1700 may include a driver 1710 and switches S1, S2, S3, and S4. The driver 1710 may receive the data DAT. The driver 1710 may generate driving signals D1, D2, D3, and D4, based on the data DAT. The driving signals D1, D2, D3, and D4 may be used to control the switches S1, S2, S3, and S4 respectively.

The switches S1, S2, S3, and S4 may provide paths for outputting the current I1 in response to the driving signals D1, D2, D3, and D4 respectively. The current I1 output through the switches S1, S2, S3, and S4 may be provided to the inductive element 1705. The current I1 may flow from a first end of the inductive element 1705 to a second end of the inductive element 1705 (e.g., in a first direction), or may flow from the second end of the inductive element 1705 to the first end of the inductive element 1705 (e.g., in a second direction).

For example, the switches S1, S2, S3, and S4 may include metal-oxide-semiconductor field-effect transistors (MOSFETs), and may be turned on or turned off in response to the driving signals D1, D2, D3, and D4 respectively. However, the present disclosure is not limited to this example, and each of the switches S1, S2, S3, and S4 may include any kind of element for providing a current path.

The current I1 may be generated based on supply voltages VDD and VSS. Example embodiments for providing the supply voltage VDD to the MST circuit 1700 will be described with reference to FIGS. 9 to 16. For example, the supply voltage VSS may correspond to a ground voltage. However, the supply voltages VDD and VSS may be variously changed or modified to generate the current I1.

The MST circuit 1700 may output the current I1 through the switches S1, S2, S3, and S4 based on the supply voltage VDD. Accordingly, the current I1 may be affected by the supply voltage VDD. For example, when the supply voltage VDD is based on a battery voltage, the current I1 and the battery voltage may affect each other. This will be further described with reference to FIGS. 6 to 8.

For example, when the switches S1 and S4 are turned on and the switches S2 and S3 are turned off, the current I1 may flow in the first direction through the switch S1, the inductive element 1705, and the switch S4, based on the supply voltage VDD. For example, when the switches S1 and S4 are turned off and the switches S2 and S3 are turned on, the current I1 may flow in the second direction through the switch S2, the inductive element 1705, and the switch S3, based on the supply voltage VDD.

Figure 4:
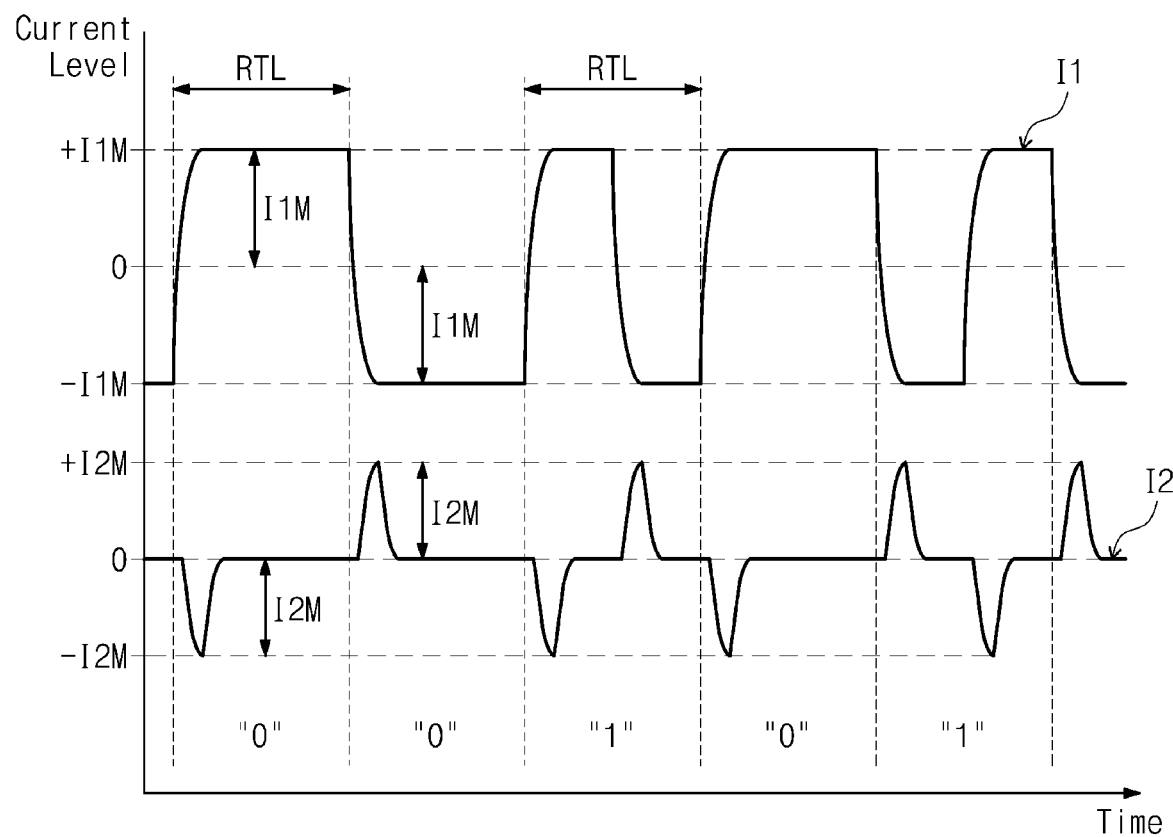
FIG. 4 is a timing diagram for describing example communication between an MST circuit and a reader device of FIG. 3.

FIG. 4 is a timing diagram for describing example communication between the MST circuit 1700 and the reader device 2000 of FIG. 3.

For example, a level of the current I1 may vary between a positive peak level +I1M and a negative peak level −I1M. It may be understood that a direction in which the current I1 having a positive level flows is opposite to a direction in which the current I1 having a negative level flows. The variation in a level of the current I1 may include a first transition and a second transition.

For example, the first transition may mean that a level of the current I1 changes from the negative peak level −I1M to the positive peak level +I1M, and the second transition may mean that a level of the current I1 changes from the positive peak level +I1M to the negative peak level −I1M. Alternatively, the first transition may mean that a level of the current I1 changes from the positive peak level +I1M to the negative peak level −I1M, and the second transition may mean that a level of the current I1 changes from the negative peak level −I1M to the positive peak level +I1M. The first transition and the second transition may be repeated alternately.

The level of the current I1 may vary corresponding to values of the data DAT. In some example embodiments, the frequency of alternation of the first transition and the second transition may be associated with a value of the data DAT. For example, a frequency at which the first transition and the second transition occur during a reference time interval RTL may indicate a value of the data DAT.

For example, when a value of the data DAT corresponds to a first logic value (e.g., logic "0"), the second transition may not occur during the reference time interval RTL after the first transition. On the other hand, when a value of the data DAT corresponds to a second logic value (e.g., logic "1"), the second transition may occur within the reference time interval RTL after the first transition.

However, the above example embodiment is provided to facilitate better understanding, and is not intended to limit the present disclosure. The current I1 may be variously changed or modified to indicate values of the data DAT suitably.

When the current I1 having a varying level flows through the inductive element 1705, the magnetic flux may be induced in the inductive element 1705. The magnetic flux induced in the inductive element 1705 may cause the magnetic flux induced in the inductive element 2705 through magnetic coupling. The magnetic flux induced in the inductive element 2705 may cause the current I2 flowing through the inductive element 2705.

Accordingly, the current I2 may be generated based on the current I1. A level of the current I2 may also vary in response to the first transition and the second transition of the current I1. For example, a level of the current I2 may vary between a positive peak level +I2M and a negative peak level −I2M.

The reader device 2000 may obtain information corresponding to the data DAT, based on the variation in the level of the current I2. For example, when the level of the current I2 changes once during the reference time interval RTL, the reader device 2000 may recognize the first logic value of the data DAT. For example, when the level of the current I2 changes twice during the reference time interval RTL, the reader device 2000 may recognize the second logic value of the data DAT. In this manner, the reader device 2000 may obtain the information corresponding to the data DAT.

Figure 5:
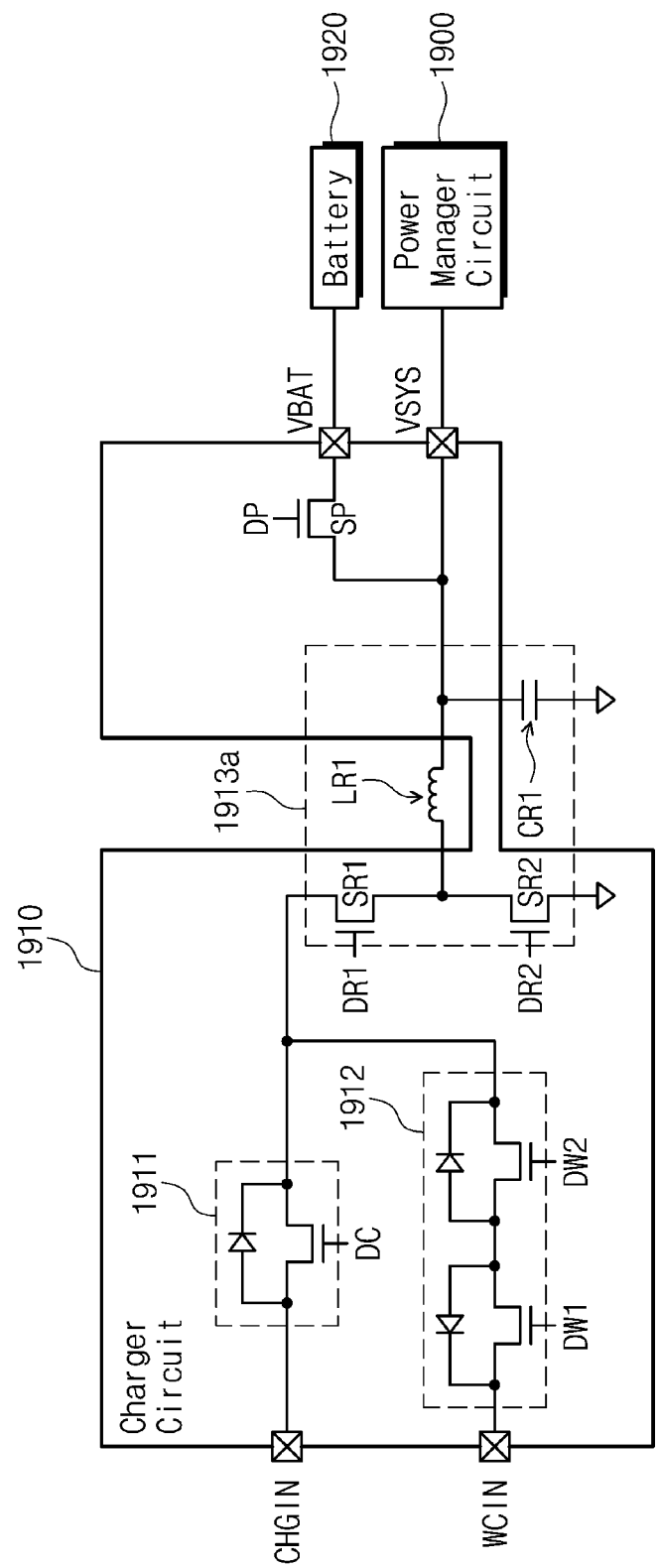
FIG. 5 is a block diagram illustrating an example configuration associated with a charger circuit of FIG. 1.

FIG. 5 is a block diagram illustrating an example configuration associated with the charger circuit 1910 of FIG. 1. The charger circuit 1910 may suitably transfer and distribute power which is used in the electronic device 1000.

In some example embodiments, the charger circuit 1910 may include switches 1911 and 1912, transistors SR1 and SR2 of a voltage regulator 1913a, and a switch SP. In some example embodiments, the charger circuit 1910 may be connected with an inductive element LR1 and a capacitive element CR1. The inductive element LR1 and the capacitive element CR1 may be disposed outside the charger circuit 1910, or may be provided within the charger circuit 1910.

In a charging mode, the charger circuit 1910 may output a charging voltage to charge the battery 1920. The charging voltage may be output through a battery terminal connected to the battery 1920. The charger circuit 1910 may output the charging voltage based on at least one of charging inputs CHGIN and WCIN which are received through charging input terminals.

The charging inputs CHGIN and WCIN may include power received through the charging input terminals from an external power source. For example, the charging input CHGIN may include power received from an external power source (e.g., a transformer, a power outlet, and/or the like) through a wired connection (e.g., a conducting wire, a cable, and/or the like). For example, the charging input WCIN may include power wirelessly received from a wireless charging terminal (e.g., through magnetic coupling).

The charging mode may be initiated in response to connection of a charging input to a charging input terminal. When the charging input CHGIN is detected, the switch 1911 may provide a power transfer path in response to a control signal DC. When the charging input WCIN is detected, the switch 1912 may provide a power transfer path in response to control signals DW1 and DW2.

The transistors SR1 and SR2, the inductive element LR1, and the capacitive element CR1 may constitute the voltage regulator 1913a. As the transistors SR1 and SR2 are respectively turned on or turned off in response to control signals DR1 and DR2, energy of the charging input CHGIN or WCIN may be transferred to the inductive element LR1, or energy of the inductive element LR1 may be emitted. The capacitive element CR1 may buffer an output of the inductive element LR1.

Accordingly, the voltage regulator 1913a may output a regulated voltage, based on the power of the charging input CHGIN or WCIN. The operations of the voltage regulator 1913a may be readily understood by those skilled in the art, and thus a detailed description associated with the voltage regulator 1913a will be omitted.

An output of the voltage regulator 1913a may be provided to the battery 1920 through the switch SP. The switch SP may provide a power transfer path directed to the battery 1920 in response to a control signal DP in the charging mode. Accordingly, the battery 1920 may be charged.

The charger circuit 1910 may further include a charging controller to deal with the control signals DC, DW1, DW2, DR1, DR2, and DP. FIG. 5 illustrates that the switches 1911, 1912, and SP include transistors and didoes. However, FIG. 5 is provided to facilitate better understanding, and is not intended to limit the present disclosure. The switches 1911, 1912, and SP may be variously changed or modified to provide a power transfer path.

In a battery operation mode, the charger circuit 1910 may receive a battery voltage VBAT output from the battery 1920, through a battery terminal. The battery operation mode may be initiated when connection from an external input to the charging input terminals is not provided. In the battery operation mode, the switch SP may provide a power transfer path in response to the control signal DP, and a system voltage VSYS may be provided based on the battery voltage VBAT. The system voltage VSYS may be provided to the power manager circuit 1900 to generate power to be supplied to components of the electronic device 1000.

The power manager circuit 1900 may transfer power, which is obtained by suitably converting the system voltage VSYS, to the components of the electronic device 1000. Accordingly, in the battery operation mode, the electronic device 1000 may operate using the power provided from the battery 1920. In some cases, in the charging mode, the system voltage VSYS may be provided based on the power of the charging input CHGIN or WCIN, and the electronic device 1000 may operate using power provided from an external power source.

In a power source mode, the charger circuit 1910 may output an operation voltage for operating a peripheral device. The power source mode may be initiated in response to connection with the peripheral device. For example, a peripheral device for assisting the use of the electronic device 1000 may be connected (in a wired manner or a wireless manner) to at least one of the charging input terminals. When the connection with the peripheral device is detected, the charger circuit 1910 may output the operation voltage based on the battery voltage VBAT.

Figure 6:
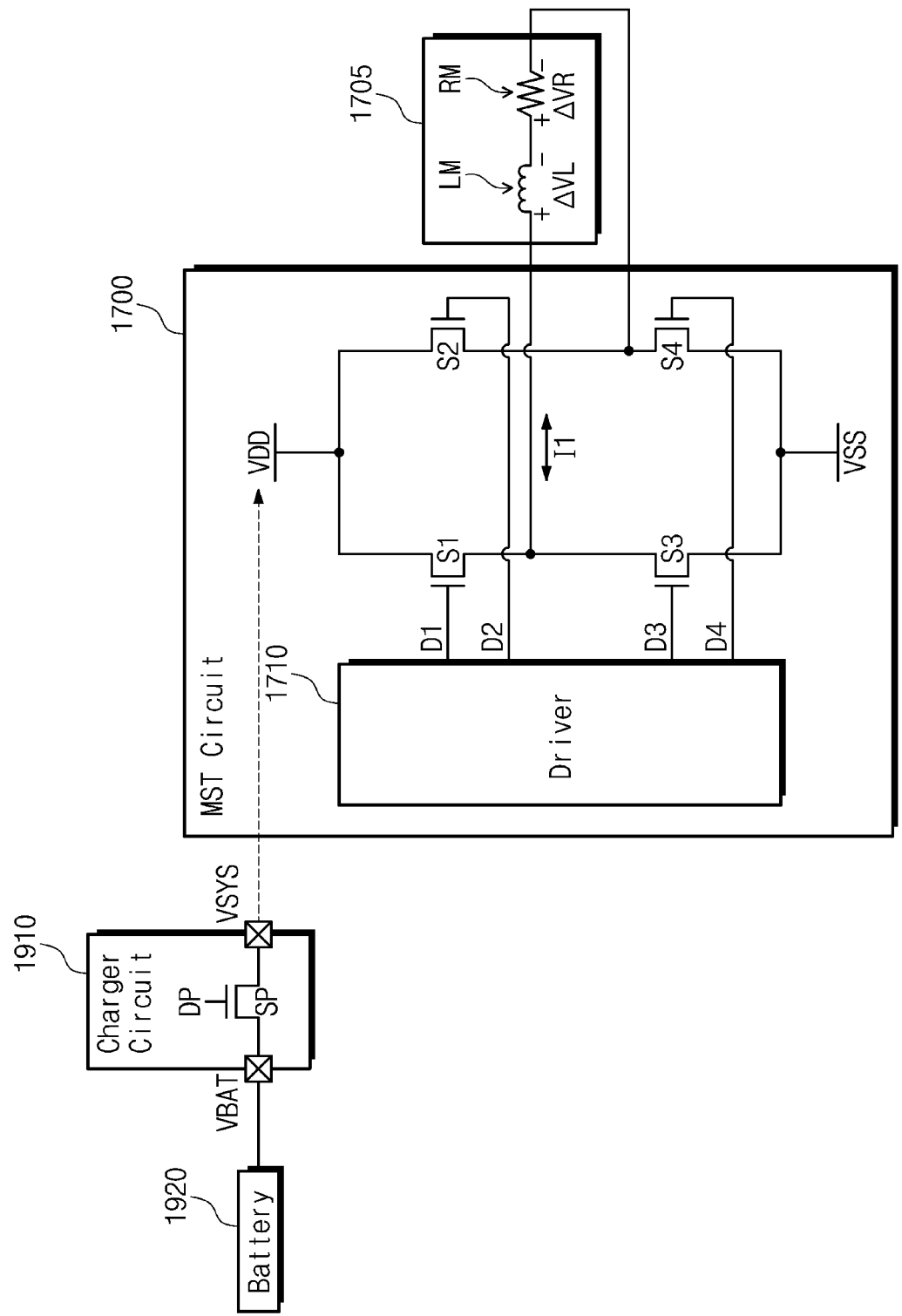
FIG. 6 is a block diagram illustrating an example configuration for providing a voltage to an MST circuit of FIG. 1.

FIG. 6 is a block diagram illustrating an example configuration for providing a voltage to the MST circuit 1700 of FIG. 1.

The inductive element 1705 may include an inductive component LM. An ideal inductive element may include only an inductive component, but the actual inductive element 1705 may include a resistance component RM.

As the current I1 flows through the inductive element 1705, a voltage drop $\Delta$VL may occur in the inductive component LM, and a voltage drop $\Delta$VR may occur in the resistance component RM. Meanwhile, due to a characteristic of the inductive element 1705, the inductive element 1705 may operate as if the inductive element 1705 is short-circuited when a long time elapses. Accordingly, when a long time elapses, the voltage drop $\Delta$VL may converge to zero (0), and only the voltage drop $\Delta$VR may be observed (e.g., at a saturation state). In this case, a level of the current I1 may correspond to a value obtained by dividing a quantity of the voltage drop $\Delta$VR by a resistance value of the resistance component RM, and the current I1 may have the positive peak level +I1M or the negative peak level $-$I1M.

When a resistance component of each of the switches S1, S2, S3, and S4 is ignorable, the quantity of the voltage drop $\Delta$VR may correspond to the supply voltage VDD. Accordingly, the level of the current I1 may correspond to a value obtained by dividing a voltage value of the supply voltage VDD by a resistance value of the resistance component RM.

Meanwhile, the charger circuit 1910 may output the system voltage VSYS, based on the battery voltage VBAT received from the battery 1920. In some cases, the system voltage VSYS may be used as the supply voltage VDD of the MST circuit 1700. That is, the supply voltage VDD may be based on the battery voltage VBAT, and the MST circuit 1700 may output the current I1 based on the system voltage VSYS.

In this example, a level of the supply voltage VDD may become higher as a level of the battery voltage VBAT becomes higher (e.g., as the battery 1920 is charged more). Accordingly, the level of the current I1 may become higher as the level of the battery voltage VBAT becomes higher. On the other hand, the level of the current I1 may become lower as the level of the battery voltage VBAT becomes lower (e.g., as the battery 1920 is discharged more and more).

Figure 7:
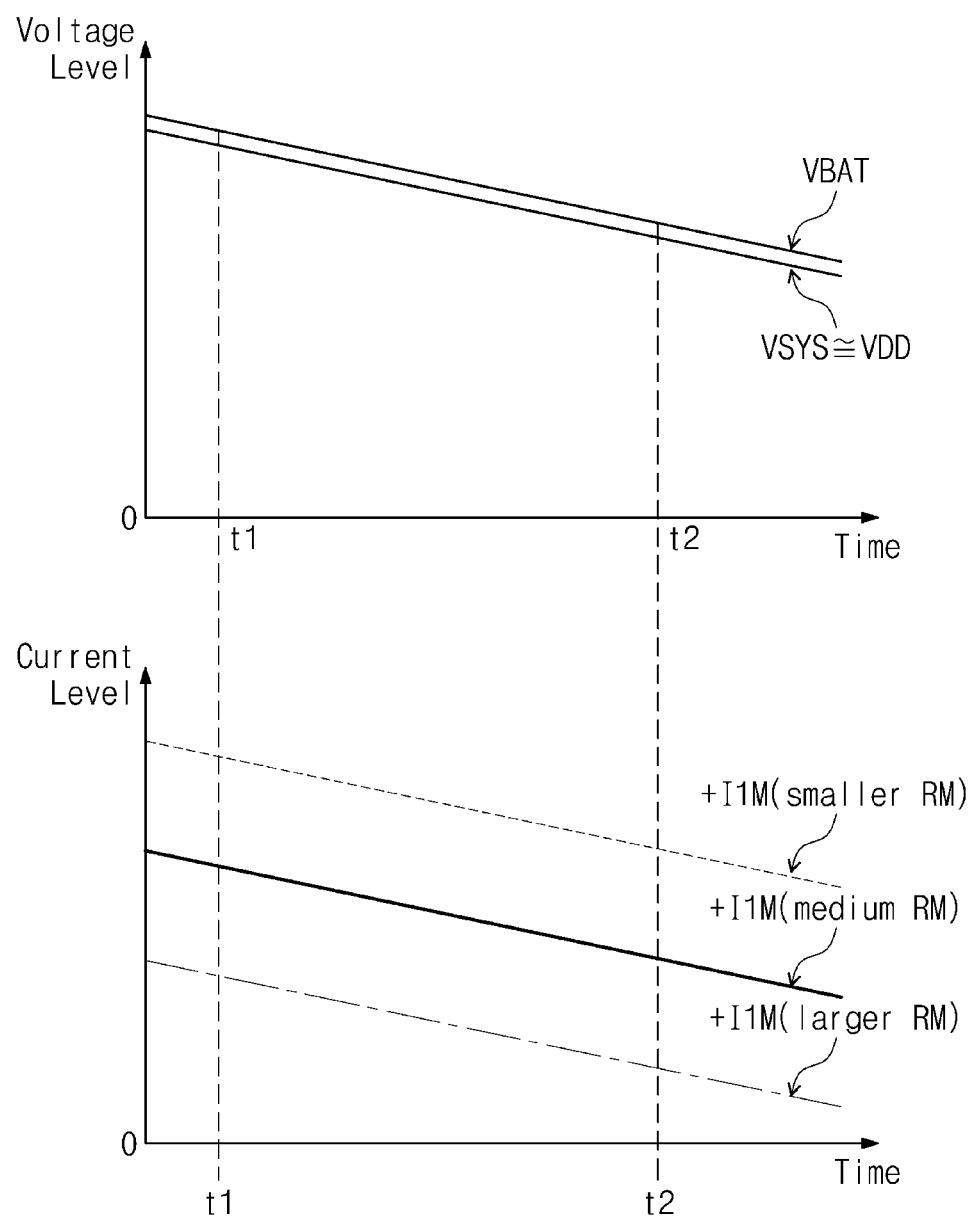
FIG. 7 illustrates graphs for describing a change in a peak level of a current in accordance with a decrease in a battery voltage with regard to an example configuration of FIG. 6.

FIG. 7 illustrates graphs for describing a change in a peak level of the current I1 in accordance with a decrease in the battery voltage VBAT with regard to the example configuration of FIG. 6. The positive peak level +I1M of the current I1 will be described to facilitate better understanding. However, it may be readily understood that the following descriptions are similarly applicable to the negative peak level −I1M of the current I1.

The battery 1920 may be discharged over time, and thus a level of the battery voltage VBAT may decrease. For example, as a time passes from a time point t1 to a time point t2, the level of the battery voltage VBAT may decrease. Accordingly, a level of the system voltage VSYS provided from the battery voltage VBAT may also decrease over time.

In addition, with regard to the example configuration of FIG. 6, when the system voltage VSYS is used as the supply voltage VDD, a level of the supply voltage VDD may also decrease over time. When the level of the supply voltage VDD decreases, the positive peak level +I1M of the current I1 may also decrease as a time passes from the time point t1 to the time point t2 (refer to a bold solid line).

The positive peak level +I1M of the current I1 may affect a communication distance. For example, at the time point t1, the positive peak level +I1M of the current I1 may be sufficiently high. Accordingly, the communication distance of the MST circuit 1700 may be long. On the other hand, at the time point t2, the positive peak level +I1M of the current I1 may be low. Accordingly, the communication distance of the MST circuit 1700 may be short.

When a resistance value of the resistance component RM of the inductive element 1705 is small (refer to a dotted line), at the time point t2, the positive peak level +I1M of the current I1 may be high even though the level of the battery voltage VBAT is low. Accordingly, a sufficient communication distance may be secured. However, when the level of the battery voltage VBAT is high at the time point t1, the positive peak level +I1M of the current I1 may be excessively high, and thus power consumption may increase.

On the other hand, when a resistance value of the resistance component RM of the inductive element 1705 is large (refer to an uneven length dash-dot broken line), at the time point t1, the positive peak level +I1M of the current I1 may be suitably obtained with small power consumption. However, when the level of the battery voltage VBAT is low at the time point t2, the positive peak level +I1M of the current I1 may be low, and thus the communication distance of the MST circuit 1700 may be short or communication may be unstable.

Figure 8:
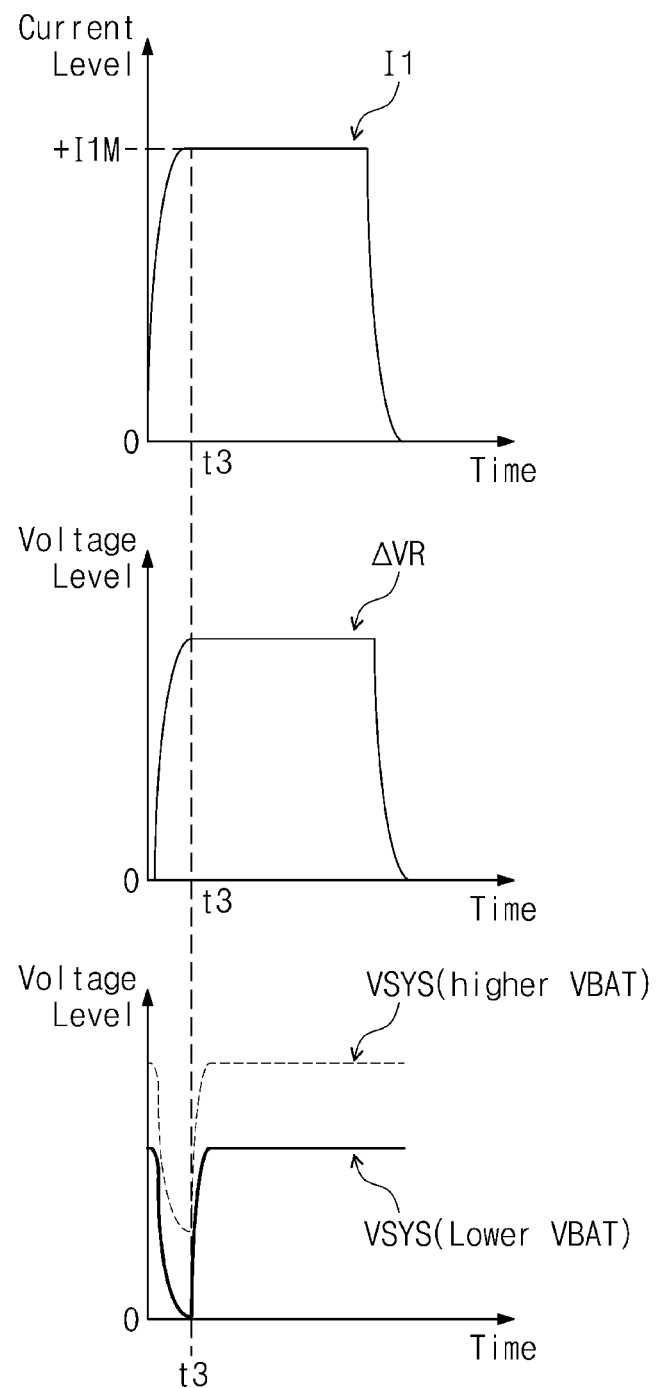
FIG. 8 illustrates graphs for describing a voltage drop in accordance with driving a current with regard to an example configuration of FIG. 6.

FIG. 8 illustrates graphs for describing a voltage drop in accordance with driving the current I1 with regard to the example configuration of FIG. 6.

As described with reference to FIG. 4, the current I1 may have a varying level. Within a time interval illustrated in FIG. 8, a level of the current I1 may vary between zero (0) and the positive peak level +I1M. As the level of the current I1 reaches the positive peak level +I1M, the voltage drop ΔVR may be saturated at a time point t3.

The MST circuit 1700 may drive the current I1 of a high level (e.g., the positive peak level +I1M) suddenly. When the MST circuit 1700 receives the system voltage VSYS as the supply voltage VDD, the current I1 may affect the system voltage VSYS. For example, due to an impedance of the battery 1920 and an impedance of a power transfer path (e.g., including the switch SP), the sudden variation of the level of the current I1 may cause an instant drop of the system voltage VSYS.

For example, as the level of the current I1 sharply increases, the level of the system voltage VSYS may instantly decrease around the time point t3. When the level of the battery voltage VBAT is high (refer to a dotted line), the drop of the system voltage VSYS may not have a significant influence on an operation of the electronic device 1000.

However, when the level of the battery voltage VBAT is low (refer to a bold solid line), the drop of the system voltage VSYS may have an influence on an operation of the electronic device 1000. For example, when the level of the system voltage VSYS almost decreases to zero (0), the electronic device 1000 may misunderstand the battery 1920 as being fully discharged and may be powered off.

With regard to the example described with reference to FIGS. 6 to 8, when the system voltage VSYS is used as the supply voltage VDD, the current I1 and the supply voltage VDD may affect the system voltage VSYS and the battery voltage VBAT, and may be affected by the system voltage VSYS and the battery voltage VBAT. For this reason, communication of the MST circuit 1700 may become unstable, and the electronic device 1000 may operate abnormally.

In some example embodiments, instead of directly using the system voltage VSYS as the supply voltage VDD, a boosted voltage which is obtained by increasing the level of the system voltage VSYS or the battery voltage VBAT may be used as the supply voltage VDD. The supply voltage VDD may be generated by being boosted based on the system voltage VSYS or the battery voltage VBAT, such that the level of the supply voltage VDD is higher than the level of the system voltage VSYS or the battery voltage VBAT.

In these example embodiments, the supply voltage VDD may be appropriately obtained regardless of a discharge of the battery 1920 and a decrease in the level of the system voltage VSYS. This will be described with reference to FIGS. 9 to 16.

Figure 9:
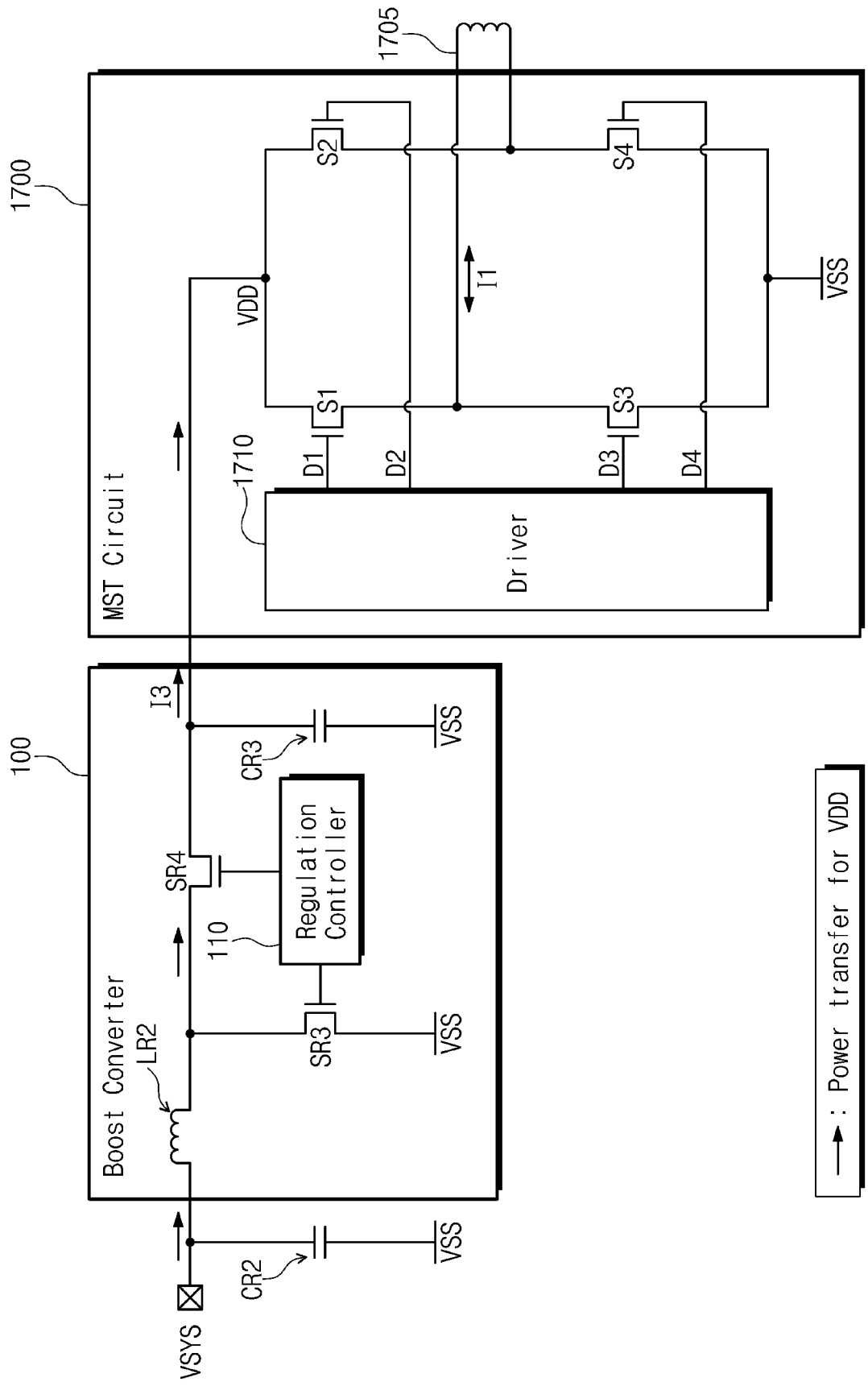
FIG. 9 is a block diagram illustrating an example configuration for providing a supply voltage to an MST circuit of FIG. 1.

FIG. 9 is a block diagram illustrating an example configuration for providing the supply voltage VDD to the MST circuit 1700 of FIG. 1.

In some example embodiments, a boost converter 100 may be connected between the charger circuit 1910 and the MST circuit 1700. The boost converter 100 may receive the system voltage VSYS from the charger circuit 1910. The boost converter 100 may boost the system voltage VSYS provided from the charger circuit 1910 (i.e., may increase a level of the system voltage VSYS) to output the supply voltage VDD. The boost converter 100 may output the boosted system voltage as the supply voltage VDD. The supply voltage VDD may be provided to the MST circuit 1700.

For example, a capacitive element CR2 may be connected between an input terminal of the boost converter 100 and the supply voltage VSS. The capacitive element CR2 may buffer the system voltage VSYS transferred to the boost converter 100.

For example, the boost converter 100 may include an inductive element LR2, transistors SR3 and SR4, a capacitive element CR3, and a regulation controller 110. The transistors SR3 and SR4 may be turned on or turned off under control of the regulation controller 110. Accordingly, energy transferred from the system voltage VSYS to the inductive element LR2 may be consumed through the transistor SR3 or may be stored in the capacitive element CR3 through the transistor SR4.

According to the above-described operations, the boost converter 100 may output the boosted system voltage, based on the power of the system voltage VSYS. As the system voltage VSYS is boosted, a level of the boosted system voltage may be higher than the level of the system voltage VSYS. The boosted system voltage may be used as the supply voltage VDD.

The regulation controller 110 may control turn-on and turn-off of the transistors SR3 and SR4, based on a result of comparing a level of the current I3 output from the boost converter 100 with a level of a reference current. The operations of the boost converter 100 may be readily understood by those skilled in the art, and thus a detailed description associated with the boost converter 100 will be omitted.

Figure 10:
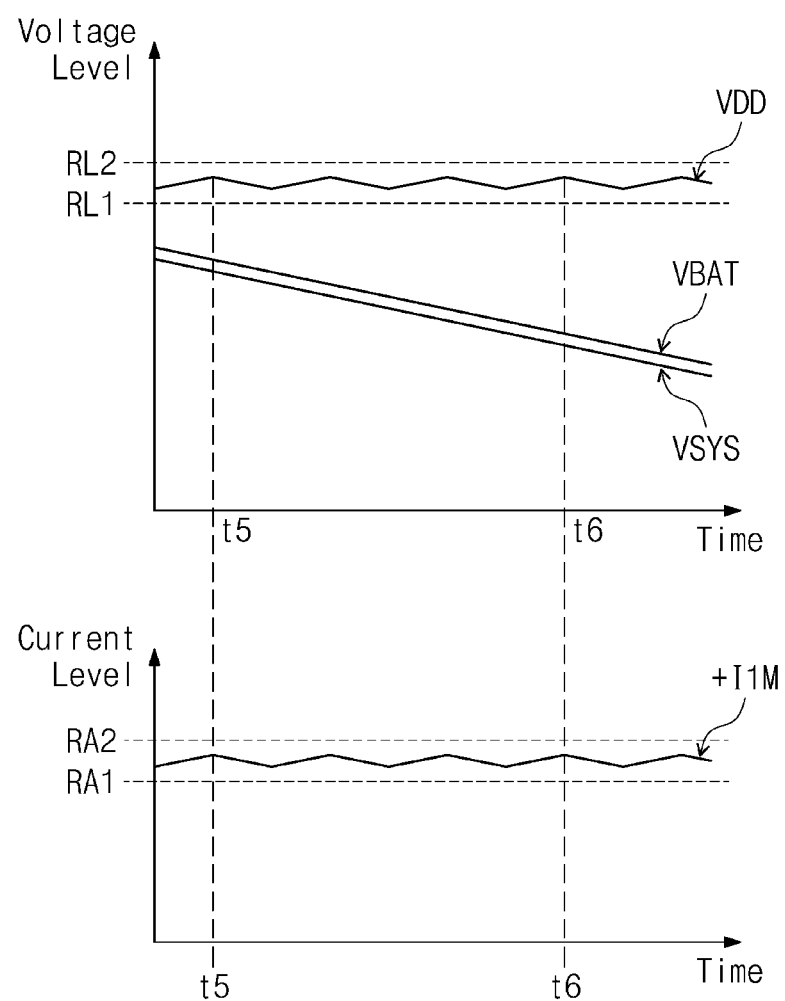
FIG. 10 illustrates graphs for describing a level of a supply voltage and a peak level of a current with regard to an example configuration of FIG. 9.

FIG. 10 illustrates graphs for describing a level of the supply voltage VDD and a peak level of the current I1 with regard to the example configuration of FIG. 9.

As a time passes from a time point t5 to a time point t6, the battery 1920 may be discharged and a level of the battery voltage VBAT may decrease. A level of the system voltage VSYS provided from the battery voltage VBAT may also decrease over time.

In the example embodiment of FIG. 9, the supply voltage VDD may be generated by boosting the system voltage VSYS. A level of the supply voltage VDD may be higher than the levels of the battery voltage VBAT and the system voltage VSYS. The level of the supply voltage VDD received in the MST circuit 1700 may be maintained to be equal to or higher than a reference level RL1 regardless of a decrease in the level of the battery voltage VBAT or the system voltage VSYS, according to an operation of the boost converter 100. The reference level RL1 may be higher than the level of the battery voltage VBAT or the system voltage VSYS.

For example, the level of the supply voltage VDD may vary between the reference level RL1 and a reference level RL2. The reference level RL2 may be higher than the reference level RL1. The transistors SR3 and SR4 may be alternately turned on and turned off under control of the regulation controller 110, and thus the supply voltage VDD may include a ripple component. However, the level of the supply voltage VDD may be maintained between the reference level RL1 and the reference level RL2.

As the level of the supply voltage VDD is maintained to be equal to or higher than the reference level RL1, an amplitude I1M of each of the positive peak level +I1M and the negative peak level −I1M of the current I1 may be maintained to be equal to or higher than a reference amplitude RA1. The reference amplitude RA1 may correspond to a value obtained by dividing the reference level RL1 by a resistance value of the resistance component RM of the inductive element 1705.

Meanwhile, as the level of the supply voltage VDD varies between the reference level RL1 and the reference level RL2, the amplitude I1M of each of the positive peak level +I1M and the negative peak level −I1M of the current I1 may vary between the reference amplitude RA1 and a reference amplitude RA2. The reference amplitude RA2 may correspond to a value obtained by dividing the reference level RL2 by the resistance value of the resistance component RM of the inductive element 1705.

With regard to the example embodiment described with reference to FIGS. 9 and 10, a boosted voltage may be used as the supply voltage VDD. The level of the supply voltage VDD may be maintained within a target voltage interval (e.g., a voltage interval between the reference level RL1 and the reference level RL2) provided according to a design of the boost converter 100. Accordingly, the amplitude I1M of a peak level of the current I1 may be maintained within a target current interval (e.g., a current interval between the reference amplitude RA1 and the reference amplitude RA2).

The amplitude I1M of the peak level of the current I1 may be determined such that a suitable communication distance is obtained while a small amount of power is consumed. The boost converter 100 may be designed to output the supply voltage VDD which makes the peak level of the current I1 have the determined amplitude.

According to the example embodiment described with reference to FIGS. 9 and 10, the peak level of the current I1 may be maintained within the target current interval, regardless of discharge of the battery 1920 and a decrease in the level of the system voltage VSYS. Accordingly, the level of the current I1 may be suitably obtained, and the MST circuit 1700 may perform stable communication without a large amount of power consumption.

In addition, as the boost converter 100 is connected and the supply voltage VDD is maintained within the target voltage interval, even though the level of the current I1 suddenly varies, the instant drop of the system voltage VSYS may be prevented or relieved. Accordingly, the abnormal operation of the electronic device 1000 may be prevented.

Moreover, the supply voltage VDD and the current I1 may be implemented to be suitable for an intention of a circuit design, and thus it may be acceptable to design the inductive element 1705 such that a resistance value of the resistance component RM is not small. Since a large amount of material is necessary to obtain a small resistance value of a resistive component, manufacturing an inductive element having a small resistance value may require high cost. Accordingly, when the resistance value of the resistance component RM is not small, the inductive element 1705 may be manufactured at low cost.

Figure 11:
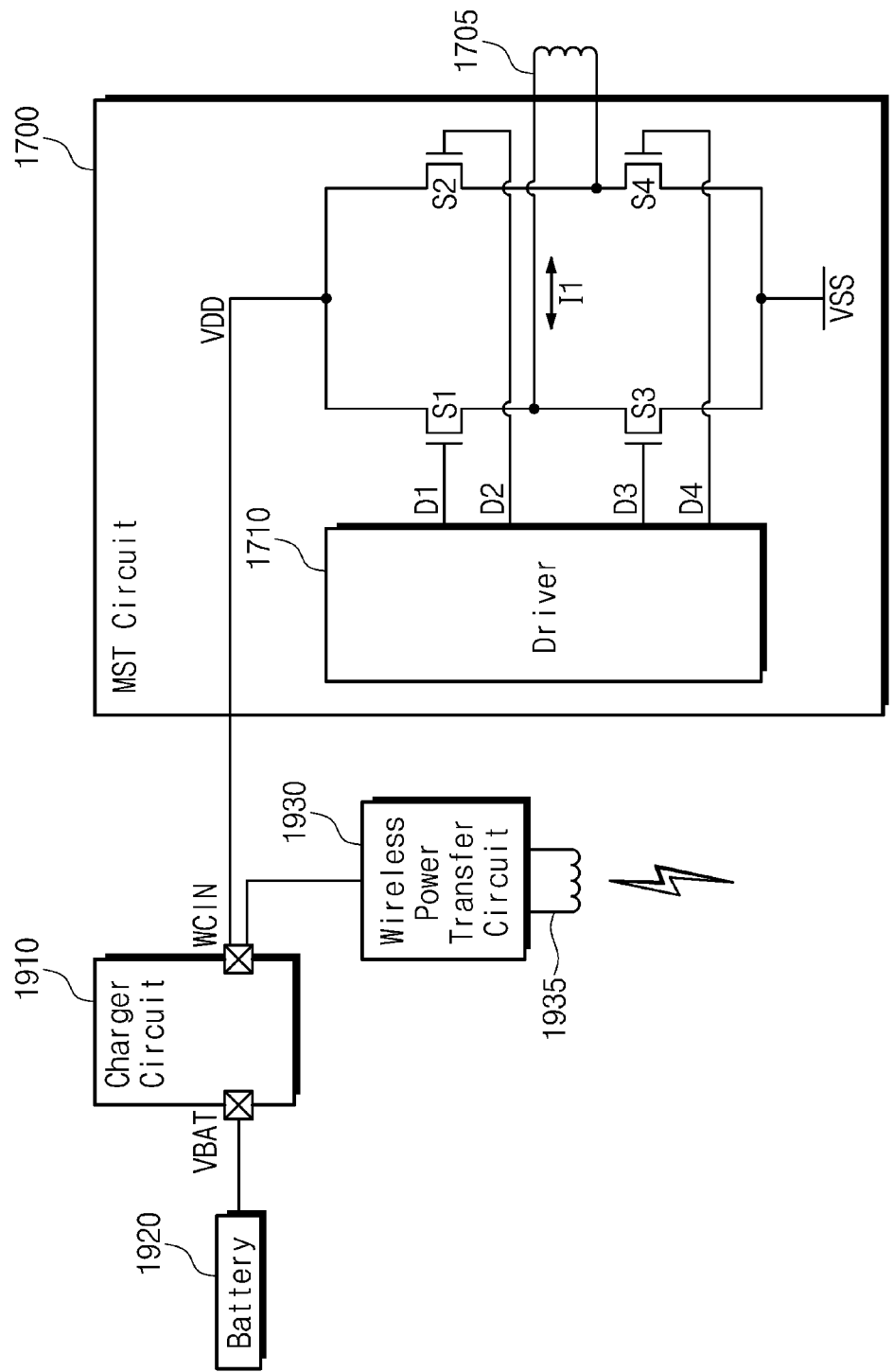
FIG. 11 is a block diagram illustrating an example configuration for providing a supply voltage to an MST circuit of FIG. 1.

FIG. 11 is a block diagram illustrating an example configuration for providing the supply voltage VDD to the MST circuit 1700 of FIG. 1.

A wireless power transfer circuit 1930 may be connected to a charging input terminal of the charger circuit 1910. The wireless power transfer circuit 1930 may wirelessly receive power from a wireless charger terminal through an inductive element 1935 (e.g., through magnetic coupling). The wireless power transfer circuit 1930 may provide the charging input WCIN to the charger circuit 1910, based on the received power.

In the charging mode, the charger circuit 1910 may receive the charging input WCIN from the wireless power transfer circuit 1930 through the charging input terminal. The charger circuit 1910 may output the charging voltage through a battery terminal based on the charging input WCIN to charge the battery 1920. The output charging voltage may be provided to the battery 1920. Accordingly, the battery 1920 may be charged based on power provided through the inductive element 1935 and the wireless power transfer circuit 1930.

In some example embodiments, the MST circuit 1700 may be connected to the charger circuit 1910 without the boost converter 100 of FIG. 9. For example, the MST circuit 1700 may be connected to the charging input terminal of the charger circuit 1910 associated with the charging input WCIN, instead of being configured to receive the system voltage VSYS from the charger circuit 1910. That is, the MST circuit 1700 of FIG. 11 may receive a voltage of the charging input terminal of the charger circuit 1910 as the supply voltage VDD.

The charger circuit 1910 may receive the battery voltage VBAT through the battery terminal, and may output the supply voltage VDD through the charging input terminal based on the battery voltage VBAT. The output supply voltage VDD may be provided to the MST circuit 1700 through the charging input terminal.

In the example configuration of FIG. 11, the charger circuit 1910 may selectively output one of the supply voltage VDD and the charging voltage. For example, in the charging mode, when the charger circuit 1910 outputs the charging voltage through the battery terminal, the charger circuit 1910 may not output the supply voltage VDD. On the other hand, in an MST mode where the MST-based communication is performed by the MST circuit 1700, when the charger circuit 1910 outputs the supply voltage VDD through the charging input terminal, the charger circuit 1910 may not output the charging voltage.

Figure 12:
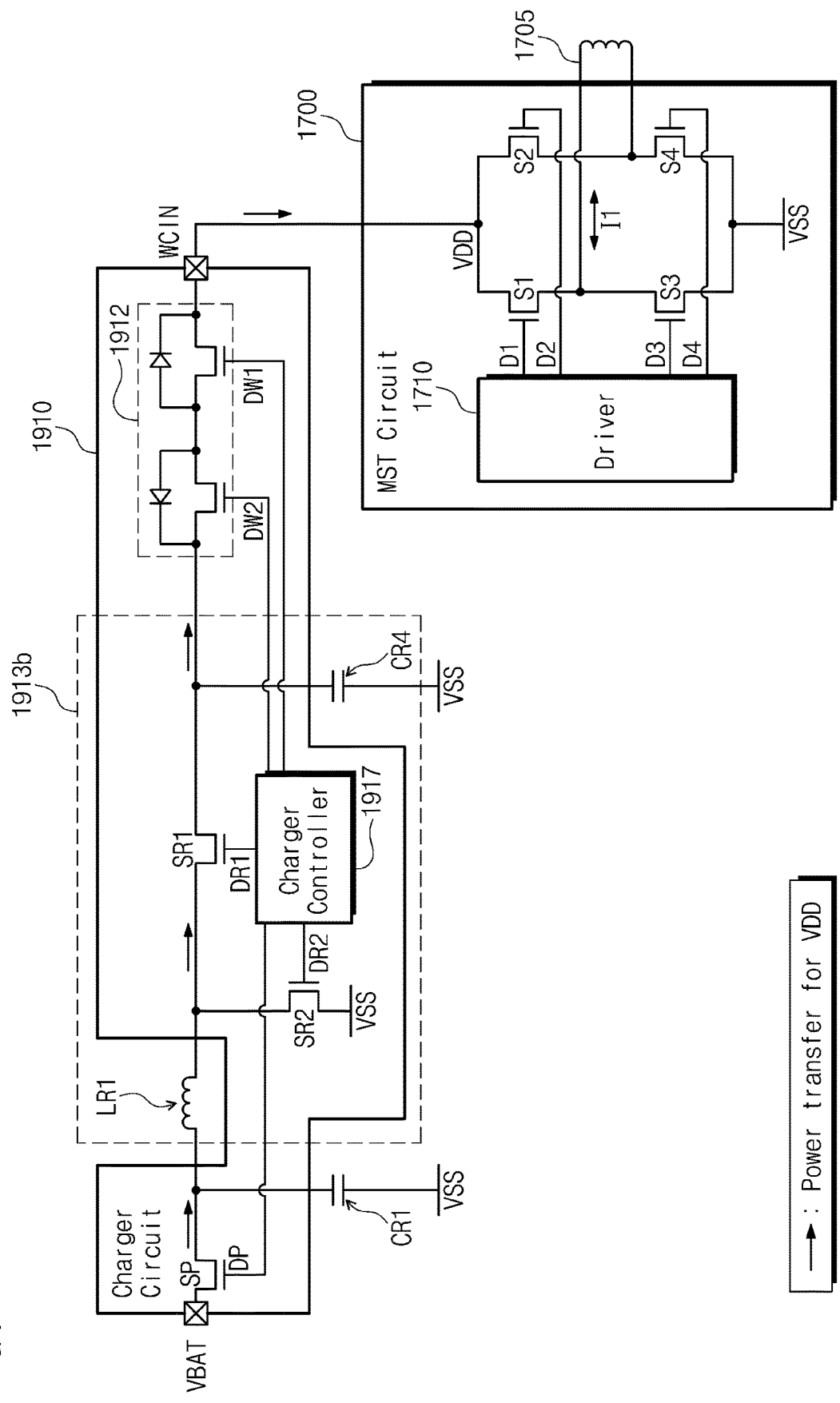
FIG. 12 is a block diagram illustrating an example configuration for providing a supply voltage to an MST circuit of FIG. 1 with regard to an example configuration of FIG. 11.

FIG. 12 is a block diagram illustrating an example configuration for providing the supply voltage VDD to the MST circuit 1700 of FIG. 1 with regard to the example configuration of FIG. 11.

As described with reference to FIG. 11, in the MST mode, the charger circuit 1910 may output the supply voltage VDD through the charging input terminal associated with the charging input WCIN. The supply voltage VDD may be generated based on the battery voltage VBAT, and may be provided to the MST circuit 1700. The MST mode may be initiated in response to a request of the MST-based communication.

As described with reference to FIG. 5, the charger circuit 1910 may include the switch SP, the transistors SR1 and SR2, and the switch 1912, and may be connected with the inductive element LR1 and the capacitive element CR1. In some example embodiments, the charger circuit 1910 may be further connected with a capacitive element CR4. The capacitive element CR4 may be disposed outside the charger circuit 1910, or may be provided within the charger circuit 1910.

The transistors SR1 and SR2, the inductive element LR1, and the capacitive element CR4 may constitute a voltage regulator 1913b. As the transistors SR1 and SR2 are respectively turned on or turned off in response to the control signals DR1 and DR2, energy transferred from the battery voltage VBAT to the inductive element LR1 may be consumed through the transistor SR2 or may be stored in the capacitive element CR4 through the transistor SR1.

According to such operations similar to those of the boost converter 100, in the MST mode, the charger circuit 1910 may boost the battery voltage VBAT and may output the boosted battery voltage. As the battery voltage VBAT is boosted, a level of the boosted battery voltage may be higher than the level of the battery voltage VBAT. The boosted battery voltage may be output as the supply voltage VDD. To this end, in the MST mode, the switch SP and the switch 1912 may provide a power transfer path in response to the control signals DP, DW1, and DW2.

The charger circuit 1910 may further include a charger controller 1917. The charger controller 1917 may suitably output the control signals DP, DR1, DR2, DW1, and DW2, based on an operation mode of the charger circuit 1910. For example, similar to the regulation controller 110 of the boost converter 100, the charger controller 1917 may control turn-on and turn-off of the transistors SR1 and SR2 based on a result of comparing a level of a current output from the charger circuit 1910 with a level of a reference current.

Similar to the example embodiment described with reference to FIG. 9, in the example embodiment of FIGS. 11 and 12, a boosted voltage may be used as the supply voltage VDD. The charger circuit 1910 and the voltage regulator 1913b may output the boosted battery voltage as the supply voltage VDD without the boost converter 100.

According to the example embodiment of FIGS. 11 and 12, regardless of a level of the battery voltage VBAT (e.g., regardless of an increase or decrease in the level of the battery voltage VBAT), the level of the supply voltage VDD may be maintained to be equal to or higher than a reference level which is higher than the level of the battery voltage VBAT. The level of the supply voltage VDD may be maintained within a target voltage interval which is provided according to a design of the charger circuit 1910 and the voltage regulator 1913b. Accordingly, regardless of discharge of the battery 1920, the amplitude I1M of the peak level of the current I1 may be maintained to be equal to or higher than a reference amplitude and may be maintained within a target current interval. These characteristics may be understood to be similar to those described with reference to FIG. 10.

According to this example embodiment, the level of the current I1 may be suitably obtained, and the MST circuit 1700 may perform stable communication without a large amount of power consumption. In addition, as the supply voltage VDD is maintained within the target voltage interval through the charger circuit 1910, even though the level of the current I1 suddenly varies, the instant drop of the battery voltage VBAT may be prevented or relieved. Accordingly, the abnormal operation of the electronic device 1000 may be prevented. In addition, the inductive element 1705 may be manufactured at low cost.

Figure 13:
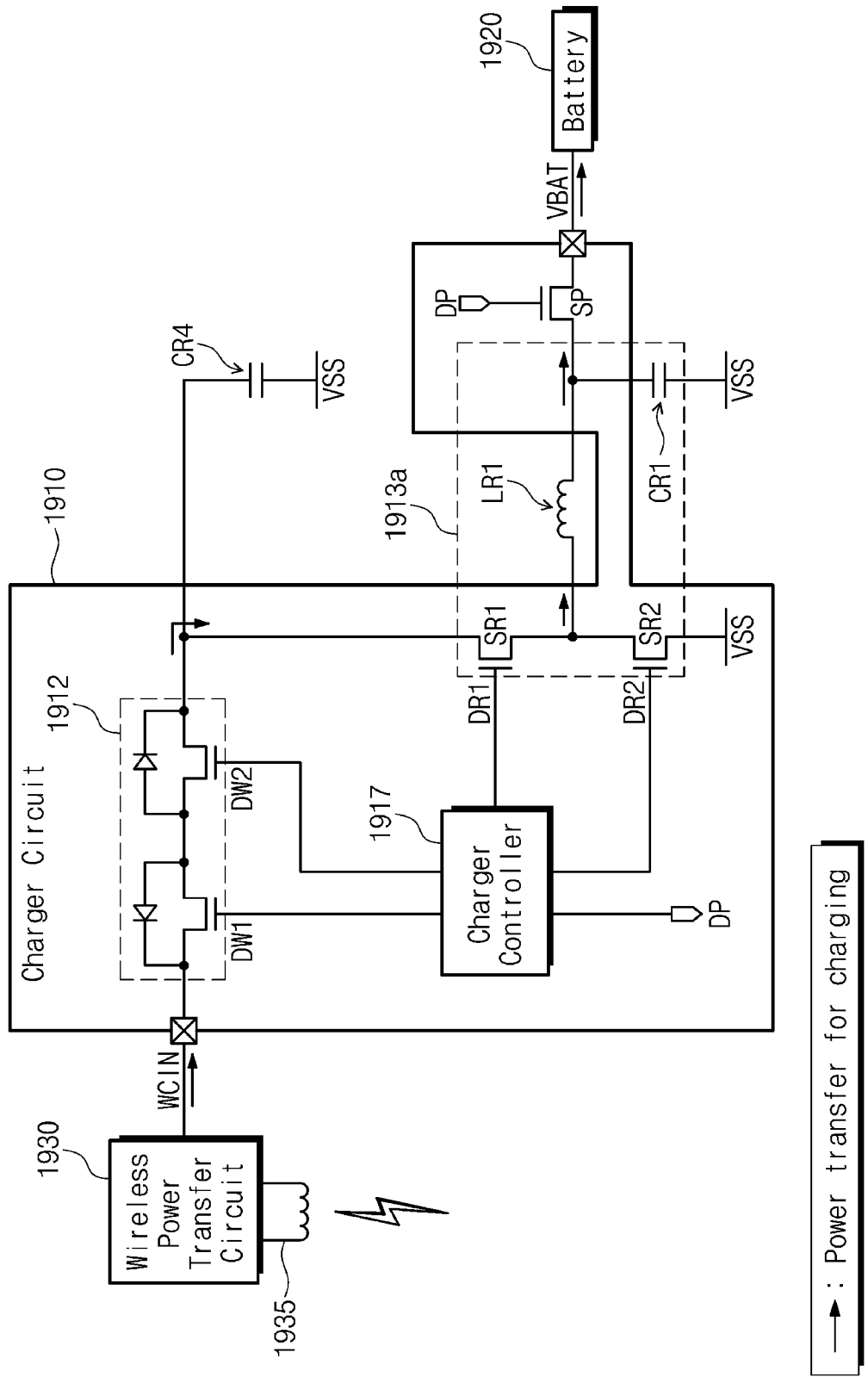
FIG. 13 is a block diagram illustrating an example configuration for charging a battery of FIG. 1 with regard to an example configuration of FIG. 11.

FIG. 13 is a block diagram illustrating an example configuration for charging the battery 1920 of FIG. 1 with regard to the example configuration of FIG. 11.

As described with reference to FIGS. 5 and 11, in the charging mode, the charger circuit 1910 may receive the charging input WCIN from the wireless power transfer circuit 1930 through the charging input terminal. The charger circuit 1910 may output the charging voltage through the battery terminal, based on the charging input WCIN. The output charging voltage may be provided to the battery 1920 to charge the battery 1920.

As described with reference to FIG. 5, the transistors SR1 and SR2, the inductive element LR1, and the capacitive element CR1 may constitute the voltage regulator 1913a. The voltage regulator 1913a may output a regulated voltage, based on the power of the charging input WCIN. For a power transfer of the charging mode, the charger controller 1917 may suitably control the switch 1912, the transistors SR1 and SR2, and the switch SP, based on the control signals DW1, DW2, DP, DR1, and DR2.

Referring to FIGS. 12 and 13 together, the transistors SR1 and SR2, the inductive element LR1, and the capacitive elements CR1 and CR4 may constitute the voltage regulator 1913a or the voltage regulator 1913b. The voltage regulator 1913a may regulate a voltage of the battery terminal from a voltage of the charging input terminal. The voltage regulator 1913b may regulate a voltage of the charging input terminal from a voltage of the battery terminal.

In the MST mode, the charger circuit 1910 may output the supply voltage VDD through the charging input terminal. In this case, the voltage regulator 1913b may operate as a boost converter. For example, the voltage regulator 1913b may boost a voltage (e.g., the battery voltage VBAT) of the battery terminal to regulate a voltage (e.g., the supply voltage VDD) of the charging input terminal. The charger circuit 1910 may output the regulated voltage of the charging input terminal as the supply voltage VDD.

In the charging mode, the charger circuit 1910 may output the charging voltage through the battery terminal. In this case, the voltage regulator 1913a may operate as a buck converter. For example, the voltage regulator 1913a may drop a voltage of the charging input terminal (e.g., a voltage of the charging input WCIN) to regulate a voltage (e.g., the charging voltage) of the battery terminal. The charger circuit 1910 may output the regulated voltage of the battery terminal as the charging voltage.

The charger circuit 1910 may provide functions of both the boost converter and the buck converter, through the voltage regulator 1913a or 1913b. That is, even though only the charger circuit 1910 is provided without the additional boost converter 100, the MST circuit 1700 may receive a boosted voltage as the supply voltage VDD. Accordingly, in comparison to the example configuration of FIG. 9, the example configuration of FIGS. 11 to 13 may not require an additional circuit area and may be implemented on a relatively smaller area.

Meanwhile, elements (e.g., the inductive element LR1 and the capacitive elements CR1 and CR4) associated with the charger circuit 1910 may have element values (e.g., an inductance value, a capacitance value, and/or a resistance value) suitable to charge the battery 1920. On the other hand, elements (e.g., the inductive element LR2 and the capacitive elements CR2 and CR3) of the additional boost converter 100 may have element values suitable to regulate the supply voltage VDD. Accordingly, the additional boost converter 100 may provide a relatively more flexible circuit design.

Figure 14:
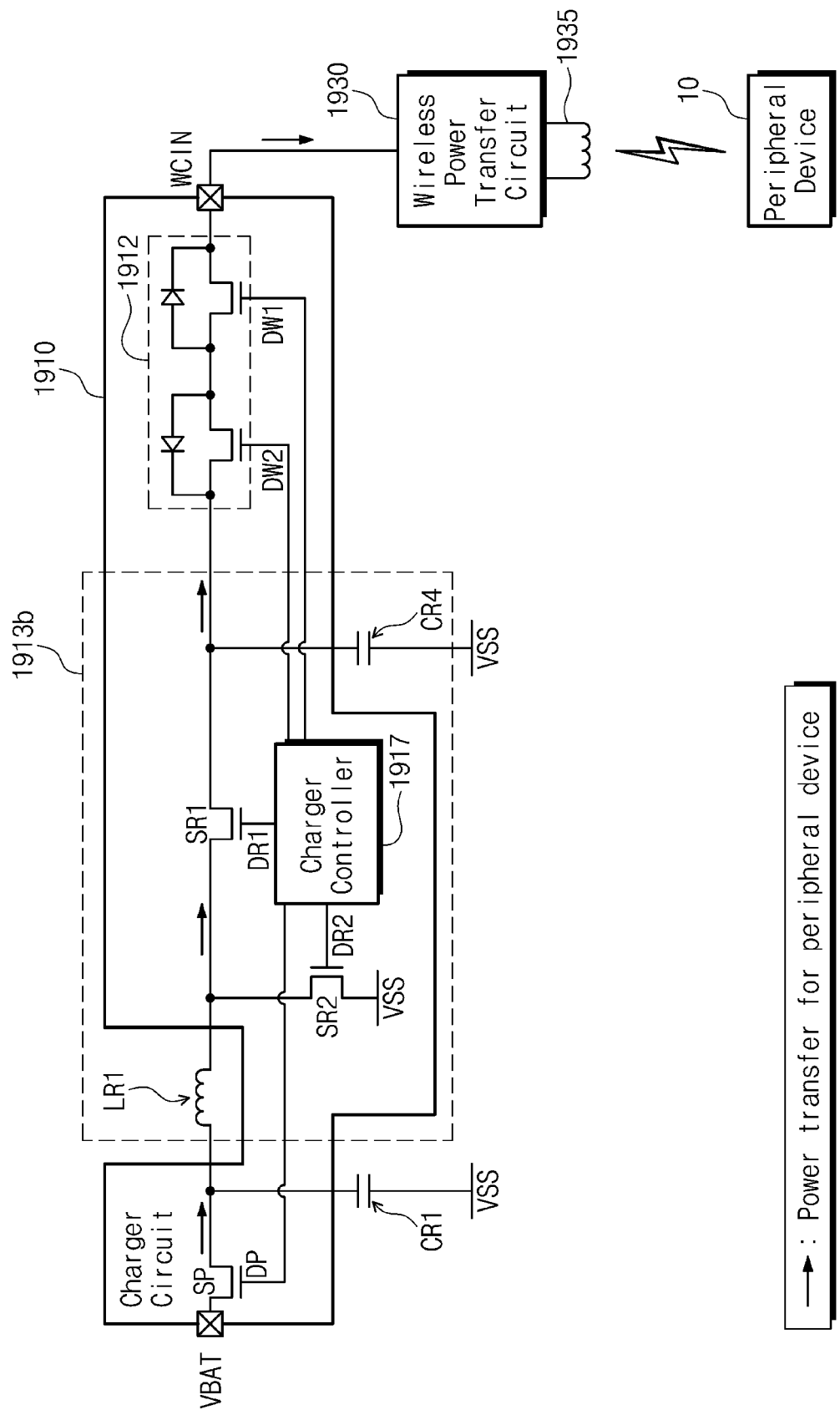
FIG. 14 is a block diagram illustrating an example configuration for providing an operation voltage to a peripheral device with regard to an example configuration of FIG. 11.

FIG. 14 is a block diagram illustrating an example configuration for providing an operation voltage to a peripheral device 10 with regard to the example configuration of FIG. 11.

For example, the peripheral device 10 may be connected with the electronic device 1000 in a wireless manner. The peripheral device 10 may be an auxiliary (or assistance) device (e.g., a keyboard, an external storage device, a speaker, a projector, and/or the like) for assisting the use of the electronic device 1000. When connection with the peripheral device 10 is provided, the charger circuit 1910 may operate in the power source mode to output the operation voltage for operating the peripheral device 10.

In the power source mode, the charger circuit 1910 may output the operation voltage through the charging input terminal associated with the charging input WCIN. The operation voltage may be generated based on the battery voltage VBAT. The operation voltage may be provided to the peripheral device 10 through the wireless power transfer circuit 1930 and the inductive element 1935 (e.g., through magnetic coupling).

Similar to those described with reference to FIG. 12, the transistors SR1 and SR2, the inductive element LR1, and the capacitive element CR4 may constitute the voltage regulator 1913b. In the power source mode, the voltage regulator 1913b may operate as a boost converter. For example, the voltage regulator 1913b may boost a voltage (e.g., the battery voltage VBAT) of the battery terminal to regulate a voltage (e.g., the operation voltage) of the charging input terminal.

The charger circuit 1910 may output the boosted battery voltage through the voltage regulator 1913b. The boosted battery voltage, i.e., the regulated voltage of the charging input terminal may be output as the operation voltage.

Figure 15:
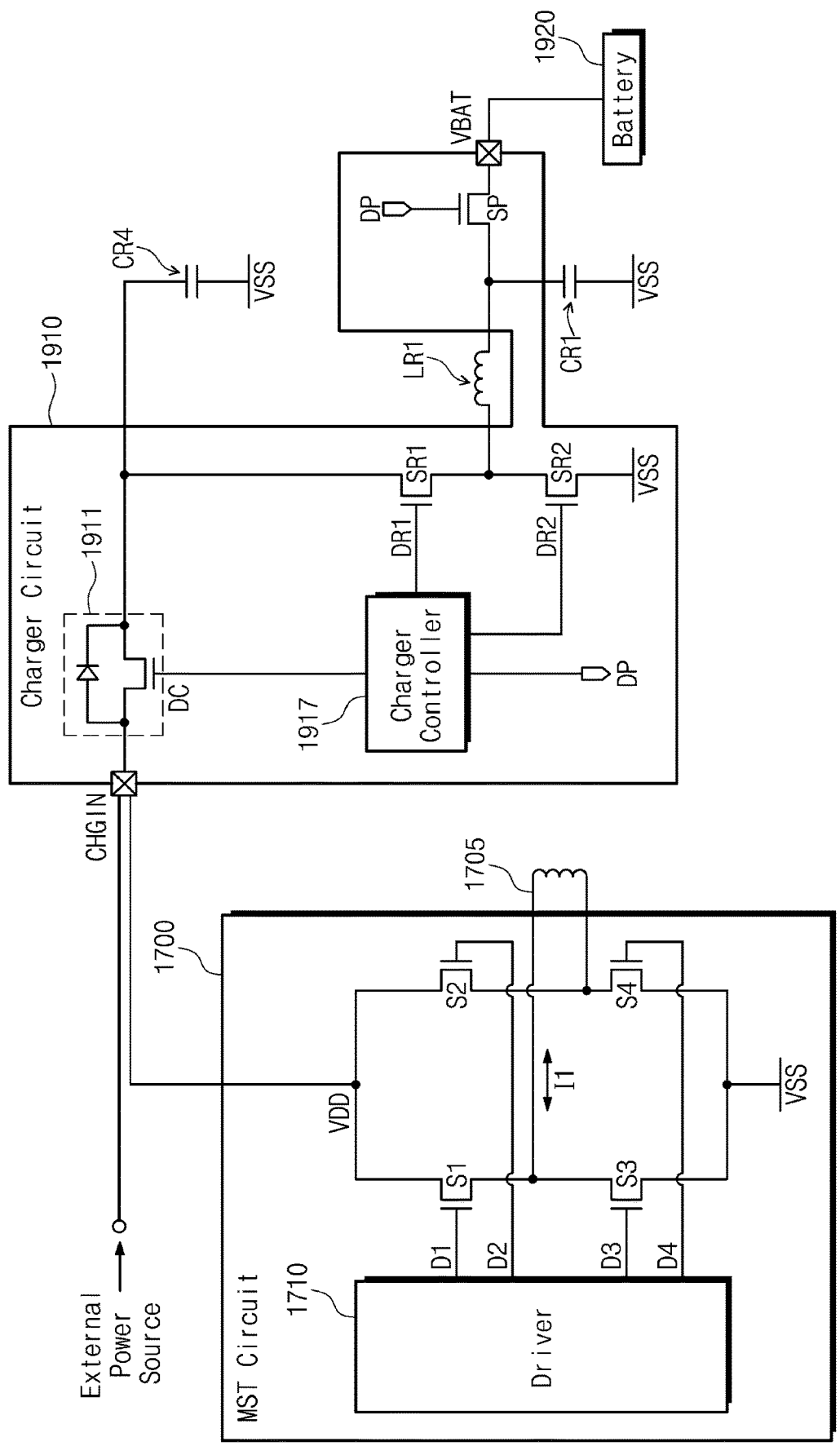
FIG. 15 is a block diagram illustrating an example configuration for providing a supply voltage to an MST circuit of FIG. 1.

FIG. 15 is a block diagram illustrating an example configuration for providing the supply voltage VDD to the MST circuit 1700 of FIG. 1.

The example configuration where the MST circuit 1700 is connected to the charging input terminal of the charger circuit 1910 associated with the charging input WCIN has been described with reference to FIGS. 11 to 14. Meanwhile, referring to FIG. 15, in some example embodiments, the MST circuit 1700 may be connected to a charging input terminal of the charger circuit 1910 associated with the charging input CHGIN.

In the charging mode, the charger circuit 1910 may output a charging voltage for charging the battery 1920, based on the charging input CHGIN received from an external power source (e.g., in a wired manner). In this case, the charger circuit 1910 and relevant elements may provide a function of a buck converter.

In the MST mode, the charger circuit 1910 may output the supply voltage VDD based on the battery voltage VBAT. The supply voltage VDD may be provided to the MST circuit 1700 through the charging input terminal associated with the charging input CHGIN. In addition, in the power source mode, a peripheral device may be connected to the charging input terminal associated with the charging input CHGIN. The charger circuit 1910 may output the operation voltage for the peripheral device, based on the battery voltage VBAT. In this case, the charger circuit 1910 and relevant elements may provide a function of a boost converter.

In the example configuration of FIG. 15, the charger circuit 1910 may selectively output one of the supply voltage VDD and the charging voltage. For example, in the charging mode, when the charger circuit 1910 outputs the charging voltage through the battery terminal, the charger circuit 1910 may not output the supply voltage VDD. On the other hand, in the MST mode, when the charger circuit 1910 outputs the supply voltage VDD through the charging input terminal, the charger circuit 1910 may not output the charging voltage.

FIG. 16 is a table for describing operations of the charger circuit 1910 with regard to the example configuration of FIG. 11 or 15.

In the charging mode, the charger circuit 1910 may provide a function of a buck converter. Meanwhile, within the charger circuit 1910, power may be transferred from the charging input terminal for the charging input WCIN or CHGIN to the battery terminal for battery charging.

In the MST mode and the power source mode, the charger circuit 1910 may provide a function of a boost converter. Meanwhile, within the charger circuit 1910, power may be transferred from the battery terminal for the battery voltage VBAT to the charging input terminal for the supply voltage VDD (or the operation voltage).

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like.

The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above descriptions are intended to provide example configurations and operations for implementing the present disclosure. The scope and spirit of the present disclosure may include implementations which are obtained by simply changing or modifying the above example embodiments, in addition to the above-described example embodiments. Also, the scope and spirit of the present disclosure includes implementations which are accomplished by easily changing or modifying the above-described example embodiments afterwards.

What is claimed is:

1. An electronic device comprising:
a transmitter circuit that outputs a current based on a supply voltage, the current having a level which varies corresponding to values of data;
an inductive element that generates an output signal based on the current, such that wireless communication with an external device is performed with regard to the data; and
a boost converter that boosts a system voltage to output the supply voltage, wherein:
a voltage level of the supply voltage provided from the boost converter to the transmitter circuit based on the boosted system voltage is maintained to be equal to or higher than a first reference level regardless of a decrease in a voltage level of the system voltage, and
the first reference level is higher than the voltage level of the system voltage.

2. The electronic device of claim 1, further comprising a power manager circuit that outputs power to be supplied to components of the electronic device, based on the system voltage.

3. The electronic device of claim 1, wherein:
as the system voltage is boosted, a voltage level of the boosted system voltage is higher than the voltage level of the system voltage, and
the boost converter outputs the boosted system voltage as the supply voltage.

4. The electronic device of claim 1, wherein variation in the level of the current includes a first transition from a first peak level to a second peak level and a second transition from the second peak level to the first peak level.

5. The electronic device of claim 4, wherein:
when a value of the data corresponds to a first logic value, the second transition does not occur during a reference time interval after the first transition, and
when a value of the data corresponds to a second logic value, the second transition occurs within the reference time interval after the first transition.

6. The electronic device of claim 4, wherein:
amplitudes of the first peak level and the second peak level are maintained to be equal to or greater than a reference amplitude, and
the reference amplitude corresponds to a value which is obtained by dividing the first reference level by a resistance value of a resistance component of the inductive element.

7. The electronic device of claim 1, wherein the voltage level of the supply voltage is maintained between the first reference level and a second reference level which is higher than the first reference level.

8. An electronic device comprising:
an inductive element that generates an output signal based on a current;
a transmitter circuit that outputs the current to the inductive element based on a supply voltage; and
a charger circuit that boosts a voltage of a battery terminal to selectively output the supply voltage, such that a voltage level of the supply voltage is maintained to be equal to or higher than a reference level regardless of a voltage level of the voltage of the battery terminal, the reference level being higher than the voltage level of the voltage of the battery terminal, wherein
the supply voltage output from the charger circuit is provided to the transmitter circuit through a charging input terminal based on the boosted voltage.

9. The electronic device of claim 8, wherein the charger circuit outputs a charging voltage for charging a battery through the battery terminal, based on power received through the charging input terminal.

10. The electronic device of claim 9, wherein:
when the charger circuit outputs the charging voltage through the battery terminal, the charger circuit does not output the supply voltage, and
when the charger circuit outputs the supply voltage through the charging input terminal, the charger circuit does not output the charging voltage.

11. The electronic device of claim 8, further comprising:
a voltage regulator comprising transistors and the inductive element that regulate a voltage of the charging input terminal from the voltage of the battery terminal or regulate the voltage of the battery terminal from the voltage of the charging input terminal, wherein
the transistors are implemented within the charger circuit.

12. The electronic device of claim 11, wherein when the charger circuit outputs a charging voltage through the battery terminal, the voltage regulator operates as a buck converter for dropping the voltage of the charging input terminal to regulate the voltage of the battery terminal.

13. The electronic device of claim 12, wherein the charger circuit outputs the regulated voltage of the battery terminal as the charging voltage.

14. The electronic device of claim 11, wherein when the charger circuit outputs the supply voltage through the charging input terminal, the voltage regulator operates as a boost converter for boosting the voltage of the battery terminal to regulate the voltage of the charging input terminal.

15. The electronic device of claim 14, wherein the charger circuit outputs the regulated voltage of the charging input terminal as the supply voltage.

16. The electronic device of claim 11, wherein when connection with a peripheral device is provided, the voltage regulator operates as a boost converter for boosting the voltage of the battery terminal to regulate the voltage of the charging input terminal.

17. The electronic device of claim 16, wherein the charger circuit outputs the regulated voltage of the charging input terminal as an operation voltage for operating the peripheral device.

18. An electronic device comprising:
a transmitter circuit that outputs a current based on a supply voltage; and
an inductive element that generates an output signal based on the current, wherein:
a voltage level of the supply voltage received in the transmitter circuit is maintained between a first reference level and a second reference level and each of the first reference level and the second reference level is higher than a voltage level of a battery voltage, and
a level of the current output from the transmitter circuit to the inductive element varies between a positive peak level and a negative peak level and amplitudes of the positive peak level and the negative peak level vary between a first reference amplitude and a second reference amplitude.

19. The electronic device of claim 18, wherein the supply voltage is generated by being boosted based on the battery voltage, such that the voltage level of the supply voltage is higher than the voltage level of the battery voltage.

20. The electronic device of claim 18, wherein the first reference amplitude and the second reference amplitude correspond to values obtained by dividing the first reference level and the second reference level by a resistance value of a resistance component of the inductive element, respectively.

* * * * *